(12) United States Patent
Hotelling et al.

(10) Patent No.: US 7,538,760 B2
(45) Date of Patent: *May 26, 2009

(54) FORCE IMAGING INPUT DEVICE AND SYSTEM

(75) Inventors: Steven P. Hotelling, San Jose, CA (US); Brian Q. Huppi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 11/278,080

(22) Filed: Mar. 30, 2006

(65) Prior Publication Data

US 2007/0229464 A1  Oct. 4, 2007

(51) Int. Cl.
*G09G 5/00* (2006.01)

(52) U.S. Cl. .................. 345/173; 345/174; 178/18.06

(58) Field of Classification Search ......... 345/173–179; 178/18.01, 18.03, 18.06
See application file for complete search history.

(56) References Cited

U.S. PATENT DOCUMENTS

| | | | |
|---|---|---|---|
| 3,333,160 A | 7/1967 | Gorski | |
| 3,541,541 A | 11/1970 | Englebart | |
| 3,662,105 A | 5/1972 | Hurst et al. ................... 178/18 |
| 3,798,370 A | 3/1974 | Hurst ......................... 178/18 |
| 4,246,452 A | 1/1981 | Chandler ...................... 200/5 |
| 4,370,697 A | 1/1983 | Haberl et al. | |
| 4,526,043 A | 7/1985 | Boie et al. | |
| 4,550,221 A | 10/1985 | Mabusth ...................... 178/18 |
| 4,672,364 A | 6/1987 | Lucas ..................... 340/365 P |
| 4,672,558 A | 6/1987 | Beckes et al. ............... 364/518 |
| 4,692,809 A | 9/1987 | Beining et al. ............. 358/247 |
| 4,695,827 A | 9/1987 | Beining et al. ........... 340/365 P |
| 4,733,222 A | 3/1988 | Evans ..................... 340/365 C |
| 4,734,685 A | 3/1988 | Watanabe ................... 340/710 |
| 4,746,770 A | 5/1988 | McAvinney .................. 178/18 |
| 4,771,276 A | 9/1988 | Parks ........................ 340/712 |

(Continued)

FOREIGN PATENT DOCUMENTS

CA       1243096       10/1988       ................. 340/180

(Continued)

OTHER PUBLICATIONS

U.S. Appl. No. 10/654,108, filed Sep. 2, 2003, entitled "Ambidextrous Mouse".

(Continued)

*Primary Examiner*—Regina Liang
(74) *Attorney, Agent, or Firm*—Morrison & Foerster LLP

(57) ABSTRACT

A force imaging touch pad includes first and second sets of conductive traces separated by a spring membrane. When a force is applied, the spring membrane deforms moving the two sets of traces closer together. The resulting change in mutual capacitance is used to generate an image indicative of the amount or intensity of the applied force. A combined location and force imaging touch pad includes two sets of drive traces, one set of sense traces and a spring membrane. In operation, one of the drive traces is used in combination with the set of sense traces to generate an image of where one or more objects touch the touch pad. The second set of drive traces is used in combination with the sense traces and spring membrane to generate an image of the applied force's strength or intensity.

62 Claims, 10 Drawing Sheets

U.S. PATENT DOCUMENTS

| | | | |
|---|---|---|---|
| 4,788,384 A | 11/1988 | Bruere-Dawson et al. | 178/18 |
| 4,806,846 A | 2/1989 | Kerber | 324/60 CD |
| 4,898,555 A | 2/1990 | Sampson | 445/22 |
| 4,968,877 A | 11/1990 | McAvinney et al. | 250/221 |
| 5,003,519 A | 3/1991 | Noirjean | 368/73 |
| 5,010,772 A | 4/1991 | Bourland et al. | |
| 5,017,030 A | 5/1991 | Crews | 400/485 |
| 5,178,477 A | 1/1993 | Gambaro | 400/489 |
| 5,189,403 A | 2/1993 | Franz et al. | 340/711 |
| 5,194,862 A | 3/1993 | Edwards | 341/20 |
| 5,224,861 A | 7/1993 | Glass et al. | 434/35 |
| 5,241,308 A | 8/1993 | Young | 341/34 |
| 5,252,951 A | 10/1993 | Tannenbaum et al. | 345/156 |
| 5,281,966 A | 1/1994 | Walsh | 341/22 |
| 5,305,017 A | 4/1994 | Gerpheide | 345/174 |
| 5,345,543 A | 9/1994 | Capps et al. | 395/137 |
| 5,376,948 A | 12/1994 | Roberts | 345/173 |
| 5,398,310 A | 3/1995 | Tchao et al. | 395/144 |
| 5,442,742 A | 8/1995 | Greyson et al. | 395/146 |
| 5,447,074 A | 9/1995 | Polaert et al. | |
| 5,463,388 A | 10/1995 | Boie et al. | 341/33 |
| 5,463,696 A | 10/1995 | Beernink et al. | 382/186 |
| 5,483,261 A | 1/1996 | Yasutake | 345/173 |
| 5,488,204 A | 1/1996 | Mead et al. | 178/18 |
| 5,495,077 A | 2/1996 | Miller et al. | 178/18 |
| 5,510,813 A * | 4/1996 | Makinwa et al. | 345/173 |
| 5,513,309 A | 4/1996 | Meier et al. | 395/155 |
| 5,523,775 A | 6/1996 | Capps | 345/179 |
| 5,530,455 A | 6/1996 | Gillick et al. | 345/163 |
| 5,543,590 A | 8/1996 | Gillespie et al. | 178/18 |
| 5,543,591 A | 8/1996 | Gillespie et al. | 178/18 |
| 5,563,632 A | 10/1996 | Roberts | 345/173 |
| 5,563,996 A | 10/1996 | Tchao | 395/144 |
| 5,565,658 A | 10/1996 | Gerpheide et al. | 178/19 |
| 5,579,036 A | 11/1996 | Yates, IV | 345/173 |
| 5,581,681 A | 12/1996 | Tchao et al. | 395/804 |
| 5,583,946 A | 12/1996 | Gourdol | 382/187 |
| 5,590,219 A | 12/1996 | Gourdol | 382/202 |
| 5,592,566 A | 1/1997 | Pagallo et al. | 382/187 |
| 5,594,810 A | 1/1997 | Gourdol | 382/187 |
| 5,596,694 A | 1/1997 | Capps | 395/152 |
| 5,612,719 A | 3/1997 | Beernink et al. | 345/173 |
| 5,631,805 A | 5/1997 | Bonsall | 361/681 |
| 5,633,955 A | 5/1997 | Bozinovic et al. | 381/187 |
| 5,634,102 A | 5/1997 | Capps | 395/334 |
| 5,636,101 A | 6/1997 | Bonsall et al. | 361/681 |
| 5,642,108 A | 6/1997 | Gopher et al. | 341/22 |
| 5,644,657 A | 7/1997 | Capps et al. | 382/229 |
| 5,648,642 A | 7/1997 | Miller et al. | |
| 5,666,113 A | 9/1997 | Logan | 341/34 |
| 5,666,502 A | 9/1997 | Capps | 345/352 |
| 5,666,552 A | 9/1997 | Grayson et al. | 395/802 |
| 5,675,361 A | 10/1997 | Santilli | 345/168 |
| 5,677,710 A | 10/1997 | Thompson-Rohrlich | 345/173 |
| 5,689,253 A | 11/1997 | Hargreaves et al. | 341/22 |
| 5,710,844 A | 1/1998 | Capps et al. | 382/317 |
| 5,729,250 A | 3/1998 | Bishop et al. | 345/175 |
| 5,730,165 A | 3/1998 | Philipp | 137/1 |
| 5,736,976 A | 4/1998 | Cheung | 345/168 |
| 5,741,990 A | 4/1998 | Davies | 84/423 R |
| 5,745,116 A | 4/1998 | Pisutha-Arnond | 345/358 |
| 5,745,716 A | 4/1998 | Tchao et al. | 395/350 |
| 5,746,818 A | 5/1998 | Yatake | 106/31.86 |
| 5,748,269 A | 5/1998 | Harris et al. | 349/58 |
| 5,764,222 A | 6/1998 | Shieh | 345/173 |
| 5,767,457 A | 6/1998 | Gerpheide et al. | 178/18 |
| 5,767,842 A | 6/1998 | Korth | 345/168 |
| 5,790,104 A | 8/1998 | Shieh | 345/173 |
| 5,790,107 A | 8/1998 | Kasser et al. | 345/174 |
| 5,801,340 A | 9/1998 | Peter | |
| 5,802,516 A | 9/1998 | Shwarts et al. | 707/6 |
| 5,808,567 A | 9/1998 | McCloud | 341/20 |
| 5,809,267 A | 9/1998 | Moran et al. | 395/358 |
| 5,821,690 A | 10/1998 | Martens et al. | 313/506 |
| 5,821,930 A | 10/1998 | Hansen | 345/340 |
| 5,823,782 A | 10/1998 | Marcus et al. | 434/156 |
| 5,825,351 A | 10/1998 | Tam | 345/173 |
| 5,825,352 A | 10/1998 | Bisset et al. | 345/173 |
| 5,841,078 A * | 11/1998 | Miller et al. | 345/173 |
| 5,854,625 A | 12/1998 | Frisch et al. | |
| 5,880,411 A | 3/1999 | Gillespie et al. | 178/18.01 |
| 5,898,434 A | 4/1999 | Small et al. | 345/348 |
| 5,920,309 A | 7/1999 | Bisset et al. | 345/173 |
| 5,923,319 A | 7/1999 | Bishop et al. | 345/175 |
| 5,933,134 A | 8/1999 | Shieh | 345/173 |
| 5,942,733 A * | 8/1999 | Allen et al. | 178/18.01 |
| 5,943,044 A | 8/1999 | Martinelli et al. | |
| 6,002,389 A | 12/1999 | Kasser | |
| 6,002,808 A | 12/1999 | Freeman | 382/288 |
| 6,020,881 A | 2/2000 | Naughton et al. | 345/327 |
| 6,031,524 A | 2/2000 | Kunert | 345/173 |
| 6,037,882 A | 3/2000 | Levy | 341/20 |
| 6,050,825 A | 4/2000 | Nichol et al. | 434/227 |
| 6,052,339 A | 4/2000 | Frenkel et al. | 368/230 |
| 6,072,494 A | 6/2000 | Nguyen | 345/358 |
| 6,084,576 A | 7/2000 | Leu et al. | 345/168 |
| 6,107,997 A | 8/2000 | Ure | 345/173 |
| 6,128,003 A | 10/2000 | Smith et al. | 345/157 |
| 6,131,299 A | 10/2000 | Raab et al. | 33/503 |
| 6,135,958 A | 10/2000 | Mikula-Curtis et al. | 600/443 |
| 6,144,380 A | 11/2000 | Schwarts et al. | 345/350 |
| 6,188,391 B1 | 2/2001 | Seely et al. | 345/173 |
| 6,198,515 B1 | 3/2001 | Cole | 348/836 |
| 6,208,329 B1 | 3/2001 | Ballare | 345/173 |
| 6,222,465 B1 | 4/2001 | Kumar et al. | 341/20 |
| 6,239,790 B1 | 5/2001 | Martinelli et al. | |
| 6,243,071 B1 | 6/2001 | Shwarts et al. | 345/146 |
| 6,246,862 B1 | 6/2001 | Grivas et al. | 455/90 |
| 6,249,606 B1 | 6/2001 | Kiraly et al. | 382/195 |
| 6,288,707 B1 | 9/2001 | Philipp | 345/168 |
| 6,289,326 B1 | 9/2001 | LaFleur | 705/702 |
| 6,292,178 B1 | 9/2001 | Bernstein et al. | 345/173 |
| 6,323,846 B1 | 11/2001 | Westerman et al. | 345/173 |
| 6,347,290 B1 | 2/2002 | Bartlett | 702/150 |
| 6,377,009 B1 | 4/2002 | Philipp | 318/468 |
| 6,380,931 B1 | 4/2002 | Gillespie et al. | 345/173 |
| 6,411,287 B1 | 6/2002 | Scharff et al. | 345/177 |
| 6,414,671 B1 | 7/2002 | Gillespie et al. | 345/157 |
| 6,421,234 B1 | 7/2002 | Ricks et al. | 361/683 |
| 6,452,514 B1 | 9/2002 | Philipp | 341/33 |
| 6,457,355 B1 | 10/2002 | Philipp | 73/304 |
| 6,466,036 B1 | 10/2002 | Philipp | 324/678 |
| 6,515,669 B1 | 2/2003 | Mohri | 345/474 |
| 6,525,749 B1 | 2/2003 | Moran et al. | 345/863 |
| 6,535,200 B2 | 3/2003 | Philipp | 345/168 |
| 6,543,684 B1 | 4/2003 | White et al. | 234/379 |
| 6,543,947 B2 | 4/2003 | Lee | 400/489 |
| 6,570,557 B1 | 5/2003 | Westerman et al. | 345/173 |
| 6,593,916 B1 | 7/2003 | Aroyan | 345/713 |
| 6,610,936 B2 | 8/2003 | Gillespie et al. | 178/18.01 |
| 6,624,833 B1 | 9/2003 | Kumar et al. | 345/863 |
| 6,639,577 B2 | 10/2003 | Eberhard | 345/102 |
| 6,650,319 B1 | 11/2003 | Hurst et al. | 345/173 |
| 6,658,994 B1 | 12/2003 | McMillan | 99/468 |
| 6,670,894 B2 | 12/2003 | Mehring | 341/22 |
| 6,677,932 B1 | 1/2004 | Westerman | 345/173 |
| 6,677,934 B1 | 1/2004 | Blanchard | 345/173 |
| 6,724,366 B2 | 4/2004 | Crawford | 345/157 |
| 6,757,002 B1 | 6/2004 | Oross et al. | 345/864 |
| 6,803,906 B1 | 10/2004 | Morrison et al. | 345/173 |
| 6,842,672 B1 | 1/2005 | Straub et al. | 701/3 |
| 6,856,259 B1 | 2/2005 | Sharp | 341/5 |
| 6,888,536 B2 | 5/2005 | Westerman et al. | 345/173 |
| 6,900,795 B1 | 5/2005 | Knight, III et al. | 345/173 |

| | | | |
|---|---|---|---|
| 6,919,882 B2 | 7/2005 | Lin et al. | |
| 6,927,761 B2 | 8/2005 | Badaye et al. | 345/173 |
| 6,942,571 B1 | 9/2005 | McAllister et al. | 463/20 |
| 6,965,375 B1 | 11/2005 | Gettemy et al. | 345/173 |
| 6,972,401 B2 | 12/2005 | Akitt et al. | 250/221 |
| 6,977,666 B1 | 12/2005 | Hedrick | 345/690 |
| 6,985,801 B1 | 1/2006 | Straub et al. | 701/3 |
| 6,992,659 B2 | 1/2006 | Gettemy | 345/173 |
| 7,030,860 B1 | 4/2006 | Hsu et al. | |
| 7,031,228 B2 | 4/2006 | Born et al. | 368/69 |
| 2001/0046604 A1 | 11/2001 | Geaghan | |
| 2002/0015024 A1 | 2/2002 | Westerman et al. | |
| 2002/0094660 A1 | 7/2002 | Getz et al. | |
| 2002/0118848 A1 | 8/2002 | Karpenstein | 381/119 |
| 2003/0006974 A1 | 1/2003 | Clough et al. | 345/179 |
| 2003/0071794 A1* | 4/2003 | Arakawa et al. | 345/173 |
| 2003/0076301 A1 | 4/2003 | Tsuk et al. | 345/159 |
| 2003/0076303 A1 | 4/2003 | Huppi | 345/163 |
| 2003/0076306 A1 | 4/2003 | Zadesky et al. | 345/173 |
| 2003/0095095 A1 | 5/2003 | Pihlaja | 345/156 |
| 2003/0095096 A1 | 5/2003 | Robbin et al. | 345/156 |
| 2003/0098858 A1 | 5/2003 | Perski et al. | 345/173 |
| 2003/0206202 A1 | 11/2003 | Moriya | 345/846 |
| 2003/0234768 A1 | 12/2003 | Rekimoto et al. | 345/169 |
| 2003/0234769 A1* | 12/2003 | Cross et al. | 345/173 |
| 2004/0090429 A1* | 5/2004 | Geaghan et al. | 345/173 |
| 2004/0119701 A1 | 6/2004 | Mulligan et al. | |
| 2004/0263484 A1 | 12/2004 | Montysalo et al. | 345/173 |
| 2005/0012723 A1 | 1/2005 | Pallakoff | 345/173 |
| 2005/0052425 A1 | 3/2005 | Zadesky et al. | 345/173 |
| 2005/0104867 A1 | 5/2005 | Westerman et al. | 345/173 |
| 2005/0110768 A1 | 5/2005 | Marriott et al. | 345/173 |
| 2006/0022955 A1 | 2/2006 | Kennedy | 345/173 |
| 2006/0022956 A1 | 2/2006 | Lengeling et al. | 345/173 |
| 2006/0026353 A1 | 2/2006 | Lesot et al. | |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0032680 A1 | 2/2006 | Elias et al. | 178/18.06 |
| 2006/0033724 A1 | 2/2006 | Chaudhri et al. | 345/173 |
| 2006/0053387 A1 | 3/2006 | Ording | 715/773 |
| 2006/0066582 A1 | 3/2006 | Lyon et al. | 345/173 |
| 2006/0085757 A1 | 4/2006 | Andre et al. | 715/771 |
| 2006/0097991 A1 | 5/2006 | Hotelling et al. | 345/173 |
| 2006/0197753 A1 | 9/2006 | Hotelling | 345/173 |
| 2007/0236466 A1* | 10/2007 | Hotelling | 345/173 |

FOREIGN PATENT DOCUMENTS

| | | |
|---|---|---|
| CN | 1675653 A | 9/2005 |
| DE | 102 51 296 | 5/2004 |
| EP | 0 483 519 A1 | 5/1992 |
| EP | 0 483 519 B1 | 5/1992 |
| EP | 0 288 692 | 7/1993 |
| EP | 0 664 504 | 7/1995 |
| EP | 0 464 908 | 9/1996 |
| EP | 1 014 295 | 1/2002 |
| EP | 1 469 415 A2 | 10/2004 |
| EP | 1 469 415 A3 | 10/2004 |
| WO | 97/18547 | 5/1997 |
| WO | 97/23738 | 7/1997 |
| WO | 98/14863 | 4/1998 |
| WO | 03/088176 | 10/2003 |
| WO | 2006/023569 | 3/2006 |

OTHER PUBLICATIONS

U.S. Appl. No. 10/789,676, filed Feb. 27, 2004, entitled "Shape Detecting Input Device".
"4- Wire Resistive Touchscreens" obtained from http://www.touchscreens.com/intro-touchtypes-4resistive.html generated Aug. 5, 2005.
"5- Wire Resistive Touchscreens" obtained from http://www.touchscreens.com/intro-touchtypes-resistive.html generated Aug. 5, 2005.
"A Brief Overview of Gesture Recognition" obtained from http://www.dai.ed.ac.uk/Cvonline/LOCA_COPIES/COHEN/gesture_overview.html, generated Apr. 20, 2004.
"Capacitive Touchscreens" obtained from http://www.touchscreens.com/intro-touchtypes-capacitive.html generated Aug. 5, 2005.
"Capacitive Position Sensing" obtained from http://www.synaptics.com/technology/cps.cfm generated Aug. 5, 2005.
"Comparing Touch Technologies" obtained from http://www.touchscreens.com/intro-touchtypes.html generated Oct. 10, 2004.
"Gesture Recognition" http://www.fingerworks.com/gesture_recognition.html.
"GlidePoint®" obtained from http://www.cirque.com/technology/technology_gp.html generated Aug. 5, 2005.
"How do touchscreen monitors know where you're touching?" obtained from http://www.electronics.howstuffworks.com/question716.html generated Aug. 5, 2005.
"How does a touchscreen work?" obtained from http://www.touchscreens.com/intro-anatomy.html generated Aug. 5, 2005.
"iGesture Products for Everyone (learn in minutes) Product Overview" FingerWorks.com.
"Infrared Touchscreens" obtained from http://www.touchscreens.com/intro-touchtypes-infrared.html generated Aug. 5, 2005.
"Mouse Emulation" FingerWorks obtained from http://www.fingerworks.com/gesture_guide_mouse.html generated Aug. 30, 2005.
"Mouse Gestures in Opera" obtained from http://www.opera.com/products/desktop/mouse/index.dml generated Aug. 30, 2005.
"Mouse Gestures," Optim oz, May 21, 2004.
"MultiTouch Overview" FingerWorks obtained from http://www.fingerworks.com/multoverview.html generated Aug. 30, 2005.
"Near Field Imaging Touchscreens" obtained from http://www.touchscreens.com/intro-touchtypes-nfi.html generated Aug. 5, 2005.
"PenTouch Capacitive Touchscreens" obtained from http://www.touchscreens.com/intro-touchtypes-pentouch.html generated Aug. 5, 2005.
"Surface Acoustic Wave Touchscreens" obtained from http://www.touchscreens.com/intro-touchtypes-saw.html generated Aug. 5, 2005.
"Symbol Commander" obtained from http://www.sensiva.com/symbolcomander/, generated Aug. 30, 2005.
"Tips for Typing" FingerWorks http://www.fingerworks.com/mini_typing.html generated Aug. 30, 2005.
"Touch Technologies Overview" 2001, 3M Touch Systems, Massachusetts.
"Wacom Components—Technology" obtained from http://www.wacom-components.com/english/tech.asp generated on Oct. 10, 2004.
"Watershed Algorithm" http://rsb.info.nih.gov/ij/plugins/watershed.html generated Aug. 5, 2005.
"FingerWorks—Gesture Guide—Application Switching," obtained from http://www.fingerworks.com/gesture_guide_apps.html, generated on Aug. 27, 2004, 1-pg.
"FingerWorks—Gesture Guide—Editing," obtained from http://www.fingerworks.com/gesure_guide_editing.html, generated on Aug. 27, 2004, 1-pg.
"FingerWorks—Gesture Guide—File Operations," obtained from http://www.fingerworks.com/gesture_guide_files.html, generated on Aug. 27, 2004, 1-pg.
"FingerWorks—Gesture Guide—Text Manipulation," obtained from http://www.fingerworks.com/gesture_guide_text_manip.html, generated on Aug. 27, 2004, 2-pg.
"FingerWorks—Gesture Guide—Tips and Tricks," obtained from http://www.fingerworks.com/gesture_guide_tips.html, generated Aug. 27, 2004, 2-pgs.
"FingerWorks—Gesture Guide—Web," obtained from http://www.fingerworks.com/gesture_guide_web.html, generated on Aug. 27, 2004, 1-pg.
"FingerWorks—Guide to Hand Gestures for USB Touchpads," obtained from http://www.fingerworks.com/igesture_userguide.html, generated Aug. 27, 2004, 1-pg.

"FingerWorks—iGesture—Technical Details," obtained from http://www.fingerworks.com/igesture_tech.html, generated Aug. 27, 2004, 1-pg.

"FingerWorks—The Only Touchpads with Ergonomic Full-Hand Resting and Relaxation!" obtained from http://www.fingerworks.com/resting.html, Copyright 2001, 1-pg.

"FingerWorks—Tips for Typing on the Mini," obtained from http://www.fingerworks.com/mini_typing.html, generated on Aug. 27, 2004, 2-pgs.

"iGesture Pad—the MultiFinger USB TouchPad with Whole-Hand Gestures," obtained from http://www.fingerworks.com/igesture.html, generated Aug. 27, 2004, 2-pgs.

Bier, et al., "Toolglass and Magic Lenses: The see-through interface" In James Kijiya, editor, Computer Graphics (SIGGRAPH '93 Proceedings), vol. 27, pp. 73-80, Aug. 1993.

Douglas et al., *The Ergonomics of Computer Pointing Devices* (1997).

European Search Report received in EP 1 621 989 (@*Beyer Weaver & Thomas, LLP*) dated Mar. 27, 2006.

EVB ELEKTRONIK "TSOP6238 IR Receiver Modules for Infrared Remote Control Systems" dated Jan. 2004 1-pg.

Fisher et al., "Repetitive Motion Disorders: The Design of Optimal Rate- Rest Profiles," Human Factors, 35(2):283-304 (Jun. 1993).

Fukumoto, et al., "ActiveClick: Tactile Feedback for Touch Panels," In CHI 2001 Summary, pp. 121-122, 2001.

Fukumoto and Yoshinobu Tonomura, "Body Coupled Fingering: Wireless Wearable Keyboard," *CHI 97*, pp. 147-154 (Mar. 1997).

Hardy, "Fingerworks" Mar. 7, 2002; BBC World On Line.

Hillier and Gerald J. Lieberman, *Introduction to Operations Research* (1986).

International Search Report dated Mar. 3, 2006 (PCT/US 05/03325; 119-0052WO).

Jacob et al., "Integrality and Separability of Input Devices," *ACM Transactions on Computer-Human Interaction*, 1:3-26 (Mar. 1994).

Kinkley et al., "Touch-Sensing Input Devices," in CHI '99 Proceedings, pp. 223-230, 1999.

KIONX "KXP84 Series Summary Data Sheet" copyright 2005,dated Oct. 21, 2005, 4-pgs.

Lee et al., "A Multi-Touch Three Dimensional Touch-Sensitive Tablet," in CHI '85 Proceedings, pp. 121-128, 2000.

Lee, "A Fast Multiple-Touch-Sensitive Input Device," Master's Thesis, University of Toronto (1984).

Matsushita et al., "HoloWall: Designing a Finger, Hand, Body and Object Sensitive Wall," In Proceedings of UIST '97, Oct. 1997.

Quantum Research Group "QT510 / QWheel™ Touch Slider IC" copyright 2004-2005, 14 pgs.

Quek, "Unencumbered Gestural Interaction," *IEEE Multimedia*, 3:36-47 (Winter 1996).

Radwin, "Activation Force and Travel Effects on Overexertion in Repetitive Key Tapping," *Human Factors*, 39(1):130-140 (Mar. 1997).

Rekimoto "SmartSkin: An Infrastructure for Freehand Manipulation on Interactive Surfaces" CHI 2002, Apr. 20-25, 2002.

Rekimoto et al., "ToolStone: Effective Use of the Physical Manipulation Vocabularies of Input Devices," In Proc. Of UIST 2000, 2000.

Rubine et al., "Programmable Finger-Tracking Instrument Controllers," *Computer Music Journal*, vol. 14, No. 1 (Spring 1990).

Retledge et al., "Force-To-Motion Functions For Pointing," Human-Computer Interaction—INTERACT (1990).

Subatai Ahmad, "A Usable Real-Time 3D Hand Tracker," Proceedings of the 28th Asilomar Conference on Signals, Systems and Computers—Part 2 (of2), vol. 2 (Oct. 1994).

Texas Instruments "TSC2003 / 12C Touch Screen Controller" Data Sheet SBAS 162, dated Oct. 2001, 20-pgs.

Wellner, "The Digital Desk Calculators: Tangible Manipulation on a Desk Top Display" In ACM UIST '91 Proceedings, pp. 27-34, Nov. 1991.

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," In CHI '85 Proceedings, pp. 280-287, 1995.

U.S. Appl. No. 10/774,053, filed Feb. 5, 2004.

U.S. Appl. No. 11/140,529, filed May 27, 2005 which is a Reissue of 6,570,557 listed above (see A152).

U.S. Appl. No. 11/381,313, filed May 2, 2006 entitled "Multipoint Touch Surface Controller".

U.S. Appl. No. 11/332,861, filed Jan. 13, 2006 which is a Reissue of 6,677,932 listed above (see A160).

U.S. Appl. No. 11/380,109, filed Apr. 25, 2006 entitled "Keystroke Tactility Arrangement On Smooth Touch Surface."

U.S. Appl. No. 11/428,501, filed Jul. 3, 2006 entitled "Capacitive Sensing Arrangement," which is a Continuation of US 2005/0104867 listed above (see A177).

U.S. Appl. No. 11/428,503, filed Jul. 3, 2006 entitled "Touch Surface" which is a Continuation of US 2005/0104867 listed above (see A177).

U.S. Appl. No. 11/428,506, filed Jul. 3, 2006 entitled "User Interface Gestures" which is a Continuation of US 2005/0104867 listed above (see A177).

U.S. Appl. No. 11/428,515, filed Jul. 3, 2006 entitled "User Interface Gestures" which is a Continuation of US 2005/0104867 listed above (see A177).

U.S. Appl. No. 11/428,522, filed Jul. 3, 2006 entitled "Identifying Contacts on a Touch Surface" which is a Continuation of US 2005/0104867 listed above (see A177).

U.S. Appl. No. 11/428,521, filed Jul. 3, 2006 entitled "Identifying Contacts on a Touch Surface" which is a Continuation of US 2005/0104867 listed above (see A177).

U.S. Appl. No. 11/426,078, filed Jun. 23, 2006 entitled "Electronic Device Having Display and Surrounding Touch Sensitive Bezel For User Interface and Control" which is a Continuation-In-Part of 2006/0197753 listed above (see A181).

U.S. Appl. No. 11/278,080, filed Mar. 30, 2006 entitled "Force Imaging Input Device and System".

U.S. Appl. No. 11/382,402, filed May 09, 2006 entitled "Force and Location Sensitive Display" which is a Continuation of 11/278,080 listed above (see C81).

International Search Report received in corresponding PCT application No. PCT/US2006/008349 dated Oct. 6, 2006.

Anonymous. (Date Unknown). "Touchscreen Technology Choices," located at <http://www.elotouch.com.products/detech2.asp,> last visited Aug. 5, 2005.

Chinese Office Action dated Jun. 6, 2008, referencing application No. 200710089811.3.

Chinese Office Action dated Aug. 15, 2008, referencing application No. 2007/10089810.9.

European Examination Report mailed Apr. 25, 2008, for EP Application No. 07251121.5, filed Mar. 16, 2007, two pages.

European Examination Report mailed Apr. 25, 2008, for EP Application No. 07251126.4, filed Mar. 16, 2007, two pages.

European Search Report dated Jul. 11, 2007, referencing application No. EP-07251121.

European Search Report dated Jul. 19, 2007, for EP Application No. EP 07251126.4, filed Mar. 16, 2007, five pages.

European Search Report dated Nov. 9, 2007 referencing application No. EP-07251126.4.

Non-Final Office Action mailed Mar. 11, 2008, for U.S. Appl. No. 11/382,402, filed May 9, 2006, 15 pages.

* cited by examiner

SECTION A-A

SECTION A-A

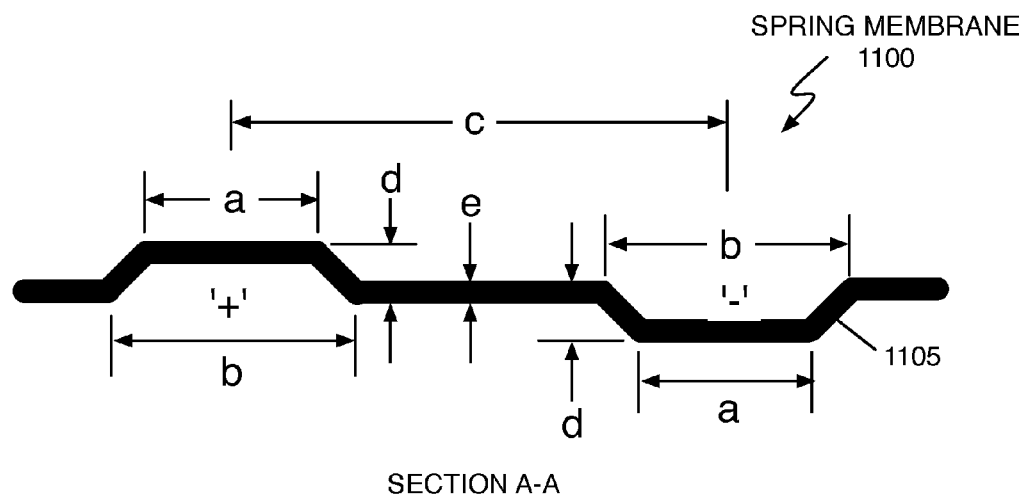
SECTION A-A
FIG. 11A
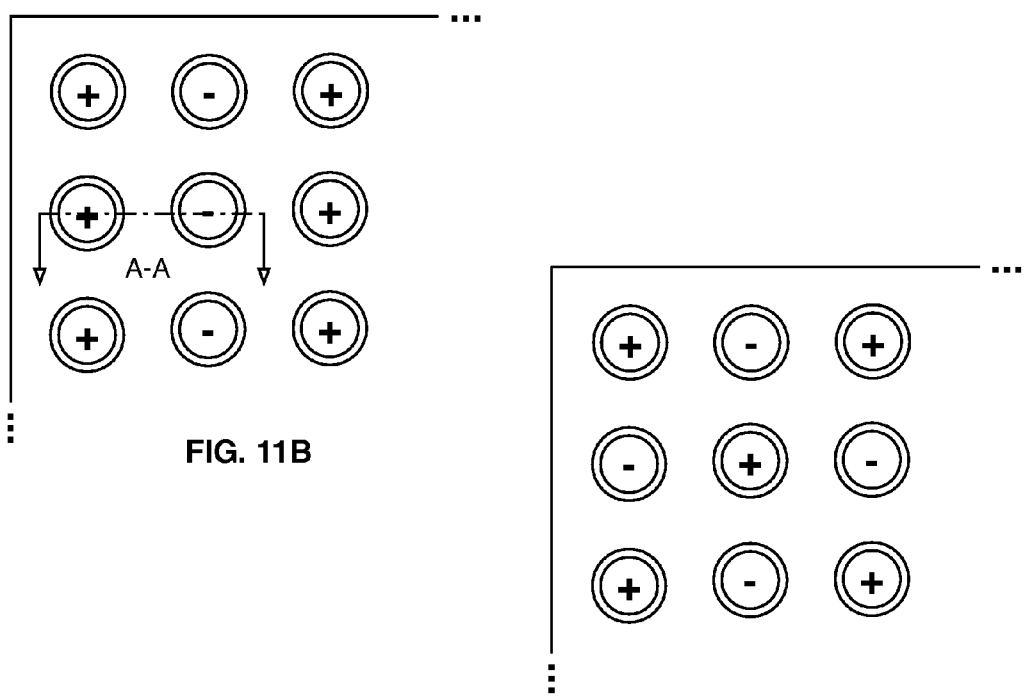
FIG. 11B
FIG. 11C

FORCE IMAGING INPUT DEVICE AND SYSTEM

BACKGROUND

The invention relates generally to electronic system input devices and, more particularly, to force imaging and location-and-force imaging mutual capacitance systems.

Numerous touch sensing devices are available for use in computer systems, personal digital assistants, mobile phones, game systems, music systems and the like (i.e., electronic systems). Perhaps the best known are resistive-membrane position sensors which have been used as keyboards and position indicators for a number of years. Other types of touch sensing devices include resistive tablets, surface acoustic wave devices, touch sensors based on resistance, capacitance, strain gages, electromagnetic sensors or pressure sensors, and optical sensors. Pressure sensitive position sensors have historically offered little benefit for use as a pointing device (as opposed to a data entry or writing device) because the pressure needed to make them operate inherently creates stiction between the finger and the sensor surface. Such stiction has, in large measure, prevented such devices from becoming popular.

Owing to the growing popularity of portable devices and the attendant need to integrate all input functions into a single form factor, the touch pad is now one of the most popular and widely used types of input device. Operationally, touch pads may be categorized as either "resistive" or "capacitive." In resistive touch pads, the pad is coated with a thin metallic electrically conductive layer and resistive layer. When the pad is touched, the conductive layers come into contact through the resistive layer causing a change in resistance (typically measured as a change in current) that is used to identify where on the pad the touch event occurred. In capacitive touch pads, a first set of conductive traces run in a first direction and are insulated by a dielectric insulator from a second set of conductive traces running in a second direction (generally orthogonal to the first direction). The grid formed by the overlapping conductive traces create an array of capacitors that can store electrical charge. When an object is brought into proximity or contact with the touch pad, the capacitance of the capacitors at that location change. This change can be used to identify the location of the touch event.

One drawback to using touch pads as input devices is that they do not generally provide pressure or force information. Force information may be used to obtain a more robust indication of how a user is manipulating a device. That is, force information may be used as another input dimension for purposes of providing command and control signals to an associated electronic device. Thus, it would be beneficial to provide a force measurement system as part of a touch pad input device.

SUMMARY

In one embodiment the invention provides a force sensitive touch pad that includes first and second sets of conductive traces separated by a spring membrane. When a force is applied, the spring membrane deforms moving the two sets of traces closer together. The resulting change in mutual capacitance is used to generate an image indicative of the location (relative to the surface of the touch pad) and strength or intensity of an applied force. In another embodiment, the invention provides a combined location and force sensitive touch pad that includes two sets of drive traces, one set of sense traces and a spring membrane. In operation, one of the drive traces is used in combination with the set of sense traces to generate an image of where one or more objects touch the touch pad. The second set of drive traces is used in combination with the sense traces and spring membrane to generate an image of the applied force's strength or intensity and its location relative to the touch pad's surface. Force touch pads and location and force touch pads in accordance with the invention may be incorporated in a variety of electronic devices to facilitate recognition of an increased array of user manipulation.

In yet another embodiment, the described force sensing architectures may be used to implement a display capable of detecting the amount of force a user applies to a display (e.g., a liquid crystal display unit). Display units in accordance with this embodiment of the invention may be used to facilitate recognition of an increased array of user input.

BRIEF DESCRIPTION OF THE DRAWINGS

FIGS. 11A-11C show various views of a spring membrane in accordance with another embodiment of the invention.

DETAILED DESCRIPTION

The following description is presented to enable any person skilled in the art to make and use the invention as claimed and is provided in the context of the particular examples discussed below (touch pad input devices for personal computer systems), variations of which will be readily apparent to those skilled in the art. Accordingly, the claims appended hereto are not intended to be limited by the disclosed embodiments, but are to be accorded their widest scope consistent with the principles and features disclosed herein. By way of example only, force imaging systems in accordance with the invention are equally applicable to electronic devices other than personal computer systems such as computer workstations, mobile phones, hand-held digital assistants and digital control panels for various machinery and systems (mechanical, electrical and electronic).

Figure 1:
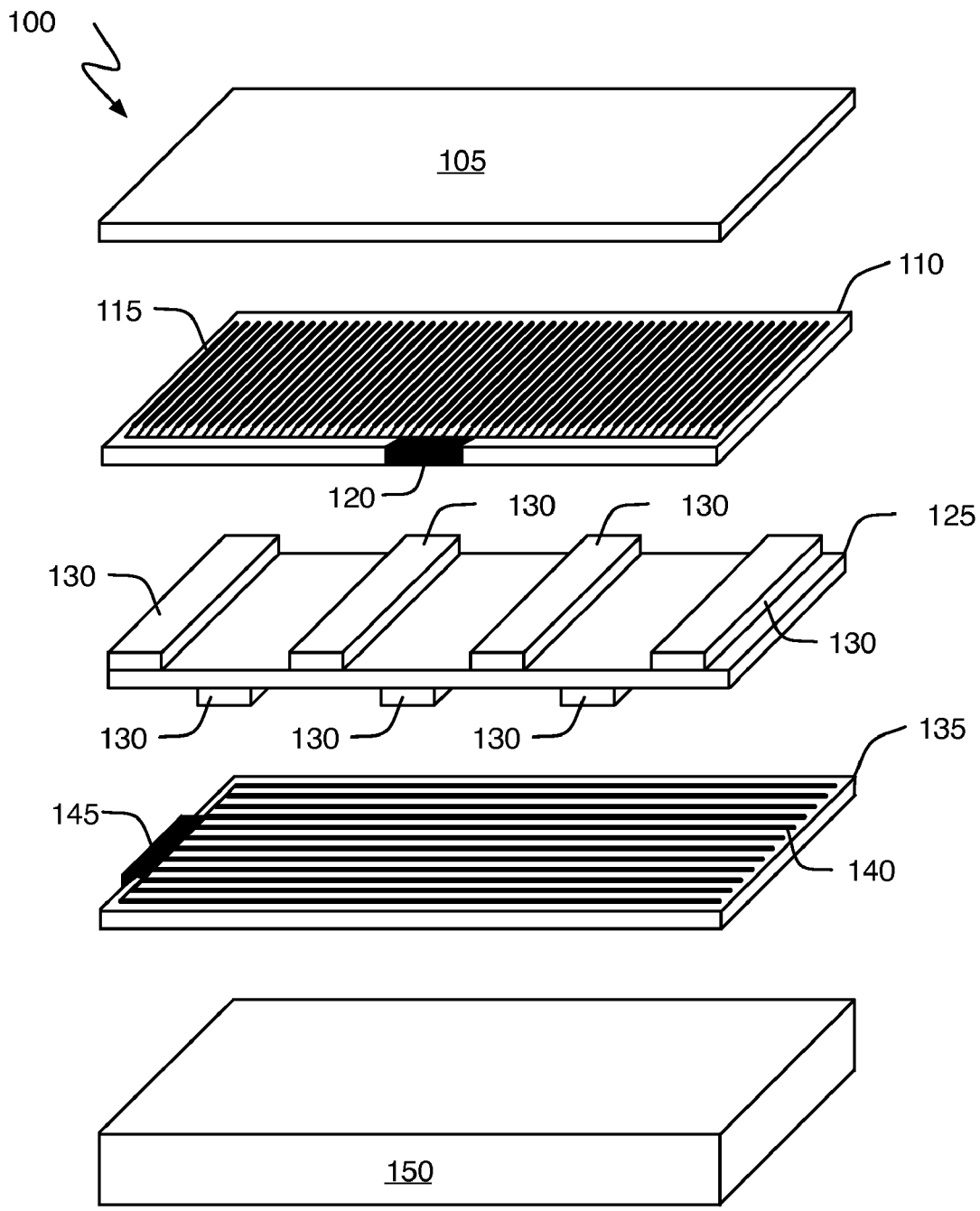
FIG. 1 shows, in exploded perspective view, a force detector in accordance with one embodiment of the invention.

Referring to FIG. 1, the general concept of a force detector in accordance with the invention is illustrated as it may be embodied in touch pad device 100. As illustrated, force detector 100 comprises cosmetic layer 105, sense layer 110 (including conductive paths 115 and electrical connector 120), dielectric spring layer 125 (including spatially offset raised structures 130), drive layer 135 (including conductive paths 140 and electrical connector 145) and base or support 150. (It will be understood by those of ordinary skill in the art that connectors 120 and 145 provide unique connections for each conductive trace on layers 110 and 135 respectively.)

Cosmetic layer 105 acts to protect other elements of the system from ambient conditions (e.g., dust and moisture) and, further, provides a surface through which users interact with detector 100. Conductive paths 115 on sense layer 110 are arranged so that they overlap conductive paths 140 on drive layer 135, thereby forming capacitors whose plates (conductive paths 115 and 140) are separated by sense layer substrate 110, dielectric spring layer 125 and raised structures 130. Dielectric spring layer 125 and raised structures 130 together create a mechanism by which sense layer 110's conductive paths 115 are brought into closer proximity to drive layer 135's conductive paths 140 when a force is applied to cosmetic layer 105. It will be recognized that this change in separation causes the mutual capacitance between sense layer and drive layer conductive paths (115 and 140) to change (increase)—a change indicative of the amount, intensity or strength of the force applied to cosmetic layer 105. Base or support layer 150 provides structural integrity for force detector 100.

Figure 2A:
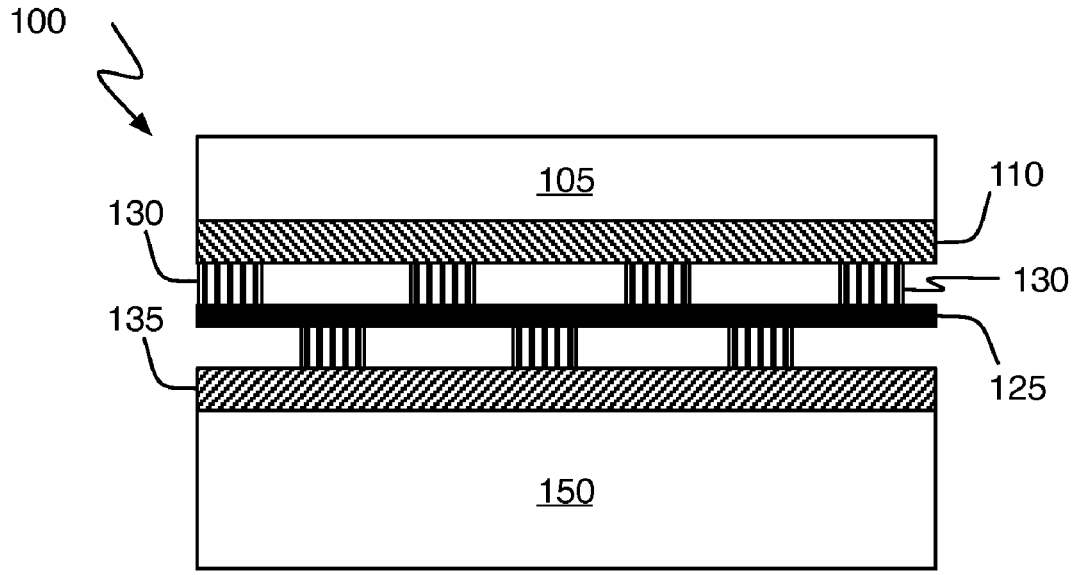
FIGS. 2A and 2B show, in cross-section, an unloaded (A) and loaded (B) force detector in accordance with FIG. 1.
Figure 2B:
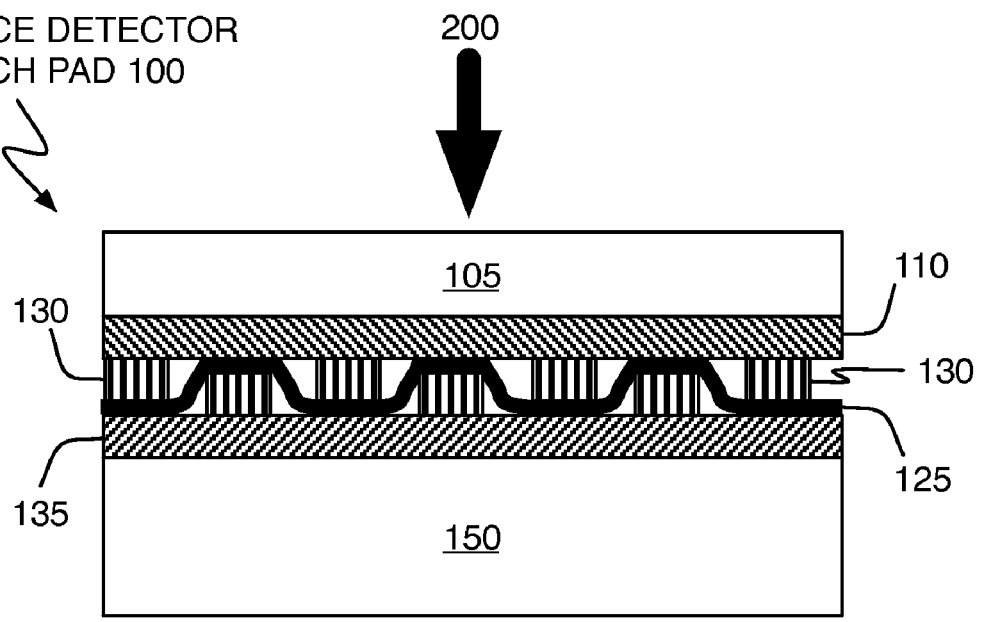

Referring to FIG. 2A, a cross-sectional view of force detector 100 is shown in its unloaded or "no force" state. In this state, the mutual capacitance between sense layer 110 and drive layer 135 conductive paths (115 and 140) results in a steady-state or quiescent capacitance signal (as measured via connectors 120 and 145 in FIG. 1). Referring to FIG. 2B, when external force 200 is applied to cosmetic layer 105, dielectric spring layer 125 is deformed so that sense layer 110 moves closer to drive layer 135. This, in turn, results in a change (increase) in the mutual capacitance between the sense and drive layers—a change that is approximately monotonically related to the distance between the two and, therefore, to the intensity or strength of applied force 200. More specifically, during operation traces 140 (on drive layer 135) are electrically stimulated one at a time and the mutual capacitance associated with the stimulated trace and each of traces 115 (on sense layer 110) is measured. In this way an image of the strength or intensity of force 200 applied to cosmetic layer 105 is obtained. As previously noted, this change in mutual capacitance may be determined though appropriate circuitry.

Figure 3:
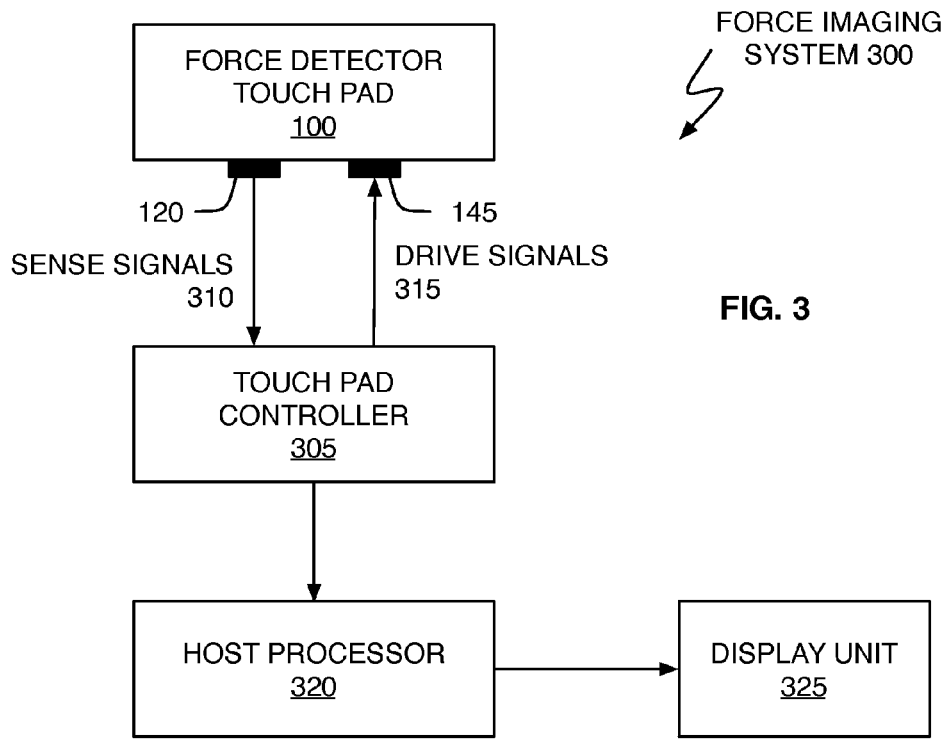
FIG. 3 shows, in block diagram form, a force detection system in accordance with one embodiment of the invention.

Referring to FIG. 3, a block diagram of force imaging system 300 utilizing force detector touch pad 100 is shown. As illustrated, force imaging system 300 comprises force detector 100 coupled to touch pad controller 305 through connectors 120 (for sense signals 310) and 145 (for drive signals 315). Touch pad controller 305, in turn, periodically sends signals to host processor 320 that represent the (spatial) distribution of force applied to detector 100. Host processor 320 may interpret the force information to perform specified command and control actions (e.g., select an object displayed on display unit 325).

Figure 4:
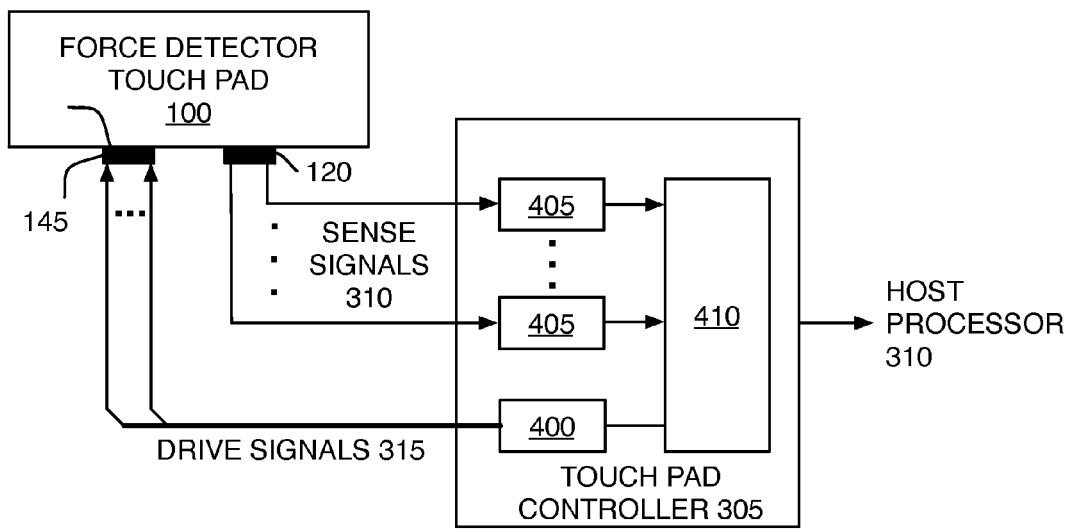
FIG. 4 shows, in block diagram form, a more detailed view of the force detection system in accordance with FIG. 3.

Referring to FIG. 4, during operation drive circuit 400 in touch pad controller 305 sends ("drives") a current through drive signals 315 and connector 145 to each of the plurality of drive layer conductive paths 140 (see FIG. 1) in turn. Because of capacitive coupling, some of this current is carried through to each of the plurality of sense layer conductive paths 115 (see FIG. 1). Sensing circuits 405 (e.g., charge amplifiers) detect the analog signal from sense signals 310 (via connector 120) and send them to analysis circuit 410. One function of analysis circuit 410 is to convert the detected analog capacitance values to digital form (e.g., through A-to-D converters). Another function of analysis circuit is to queue up a plurality of digitized capacitance values for transmission to host processor 320 (see FIG. 3). Yet another function of analysis circuit is to control drive circuit 400 and, perhaps, to dynamically adjust operation of sense circuits 405 (e.g., such as by changing the threshold value at which a "change" in capacitance is detected). One embodiment of controller 305 suitable for use in the present invention is described in US patent application entitled "Multipoint Touch Screen Controller," Ser. No. 10/999,999 by Steve Hotelling, Christoph Krah and Brian Huppi, filed 15 Mar. 2006 and which is hereby incorporated in its entirety.

Figure 5:
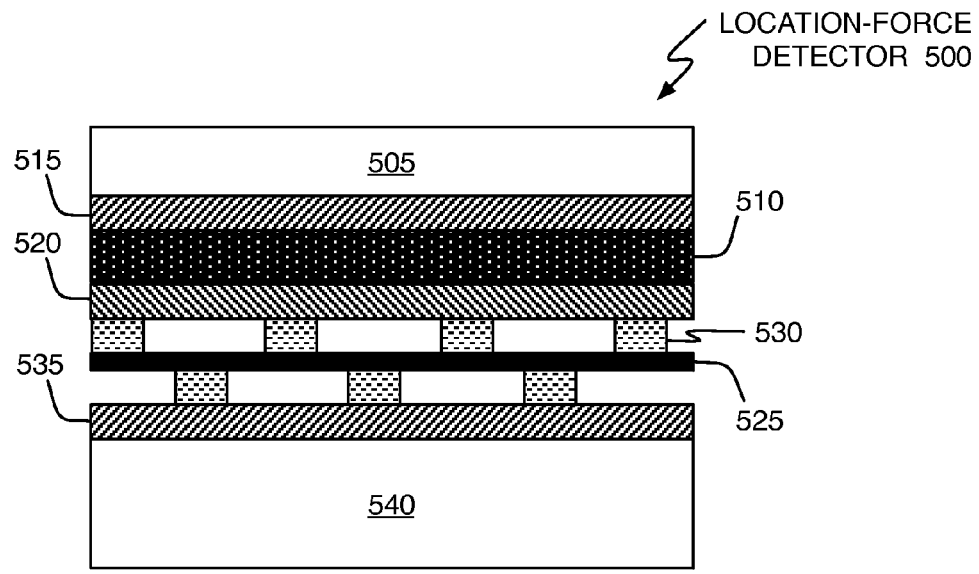
FIG. 5 shows, in cross-section, a location and force detection device in accordance with one embodiment of the invention.

In another embodiment, a force detector in accordance with the invention is combined with a capacitive location detector to create a touch pad device that provides both location and force detection. Referring to FIG. 5, combined location and force detector 500 comprises cosmetic layer 505, circuit board or substrate 510 (including a first plurality of conductive drive paths 515 on a first surface and a plurality of sense paths 520 on a second surface), dielectric spring layer 525 (including alternating, or spatially offset, raised structures 530), drive layer 535 (including a second plurality of conductive drive paths) and base or support 540. In one embodiment, conductive drive paths 515 and 535 are laid down on substrate 510 and support 540 respectively to form rows and sense conductive paths are laid down on substrate 510 to form columns. Accordingly, during operation first drive paths 515 are driven (one at a time) during a first time period and, during this same time, sense paths 520 are interrogated to obtain an image representing the location of one or more cosmetic layer touches. Similarly, second drive paths 535 are driven (one at a time) during a second time period and, during this same time, sense paths 520 are again interrogated to obtain an image representing, this time, the strength or intensity of the force applied to cosmetic layer 505. The operation of computer input devices (e.g., touch pads) for touch detection based on the principle of mutual capacitance is described in US patent application entitled "Multipoint Touchscreen" by Steve Hotelling, Joshua A. Strickon and Brian Q. Huppi, Ser. No. 10/840,862 and which is hereby incorporated in its entirety.

Figure 6:
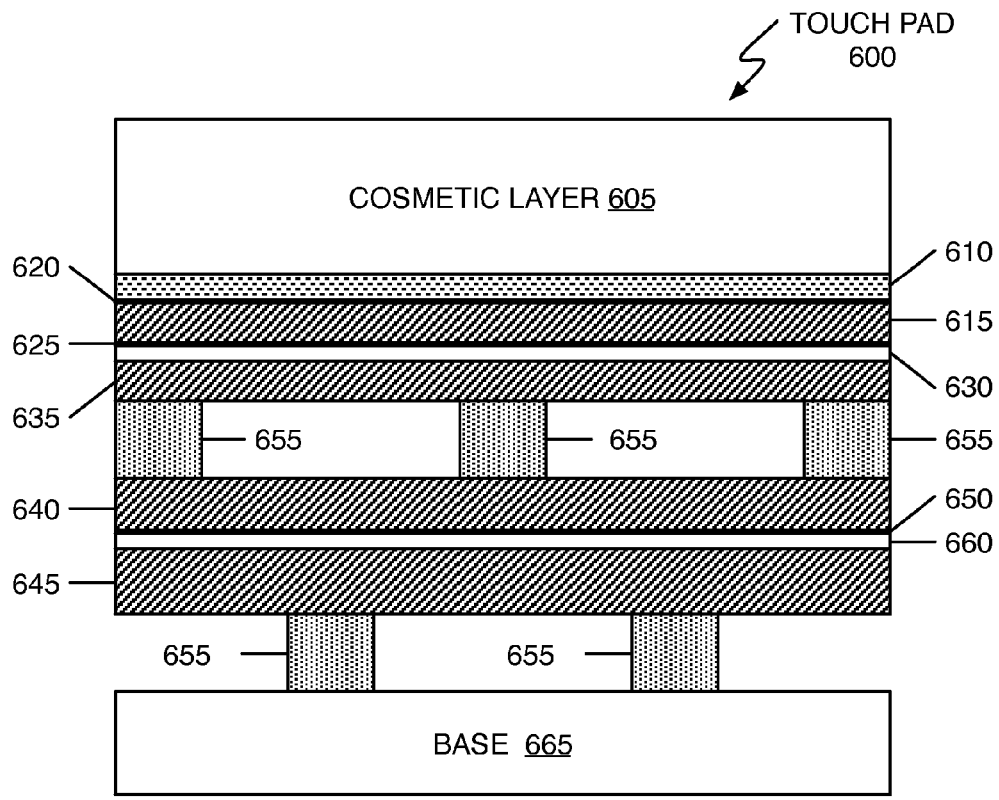
FIG. 6 shows, in cross section, a location and force detection device in accordance with another embodiment of the invention.

Referring to FIG. 6, location and force touch pad 600 in accordance with another embodiment of the invention is shown in cross section. In this embodiment, cosmetic layer 605 comprises a polyester or polycarbonate film. Layer 610 comprises an acrylic-based pressure sensitive or ultraviolet light cured adhesive. Layer 615 functions as a two-sided circuit board that has a first plurality of conductive drive traces 620 oriented in a first direction on a "top" surface (i.e., toward cosmetic layer 605) and a plurality of conductive sense traces 625 oriented in a second direction on a "bottom" surface. In one embodiment, circuit substrate layer 615 comprises a low temperature plastic or thermoplastic resin such as polyethylene terephthalate ("PET". In this embodiment, drive traces 620 and sense traces 625 may comprise printed silver ink. In another embodiment, circuit substrate layer 615 comprises a flexible circuit board, or fiberglass or glass and drive and sense traces (620 and 625) comprise Indium tin oxide ("ITO") or copper. Layer 630, in one embodiment, comprises a layered combination consisting of adhesive-PET-adhesive, where the adhesive components are as described above with respect to layer 610. Layers 635, 640 and 645 comprise PET of varying thicknesses. As shown, the "bottom" surface of layer 640 has affixed thereon a second plurality of conductive drive traces 650 oriented in substantially the same orientation as first conductive drive traces 620. Raised and spatially offset support structures 655 and layer 660 also comprise a layered combination consisting of adhesive-PET-adhesive (similar to layer 630, see above). Layers 605-660 are affixed to and supported by base or stiffener plate 665. For example, in a portable or notebook computer system, base 665 could be formed from a rigid material such as a metal stamping that is part of the computer system's frame. Similarly, base 665 could be the internal framing within a personal digital assist and or mobile telephone. Table 1 identifies the thickness for each of layers 600-660 for one embodiment of touch pad 600.

TABLE 1

Dimensions for Illustrative Touch Pad 600

| Layer | Material | Thickness (mm) |
|---|---|---|
| 605 | Polyester, polycarbonate film, glass or ceramic | 0.3 |
| 610 | Pressure sensitive adhesive ("PSA") or ultraviolet ("UV") light cured adhesive | 0.05 |
| 615 | PET | 0.075 ± 0.02 |
| 620 | Silver ink, copper, Indium tin oxide | 0.006 |
| 625 | Silver ink, copper, Indium tin oxide | 0.006 |
| 630 | Layered PSA-PET-PET | 0.03 ± 0.01 |
| 635 | PET | 0.075 ± 0.02 |
| 640 | PET | 0.1 ± 0.02 |
| 645 | PET | 0.125 ± 0.02 |
| 650 | Silver ink, copper, Indium tin oxide | 0.006 |
| 655 | Layered:   PSA | 0.025 ± 0.01 |
|  | PET | 0.1 ± 0.02 |
|  | PSA | 0.025 ± 0.01 |

Active touch pad surface: 271 mm × 69 mm
No of drive traces (620 and 650): 13
Number of sense traces (625): 54
Pixel separation: 5 mm In operation touch pad 600 measures the change (e.g., decrease) in capacitance due to cosmetic layer 605 being touched at one or more locations through the mutual capacitance between drive traces 620 and sense traces 625. In a manner as described above, touch pad 600 also measures forces applied to cosmetic layer as sense traces 625 and drive traces 650 are brought into closer proximity through the measured change (e.g., increase) in mutual capacitance between them. In this embodiment, raised structures 655 are used on both sides of the second layer of drive traces (650) to provide additional movement detection capability.

During measurement operations, each of drive traces 620 are stimulated in turn and, simultaneously, the change in mutual capacitance between drive traces 620 and sense traces 625 is measured. Once each of drive traces 620 have been stimulated (and the corresponding change in capacitance measured via sense traces 625), each of drive traces 650 are driven in turn and sense traces 625 are used to determine the change in mutual capacitance related to force (that is, the mutual capacitance change between traces 625 and 650 due to an applied force). In this manner, images of both the "touch" input and "force" input to cosmetic layer 605 can be obtained.

One of ordinary skill in the art will recognize that the above-described "scanning" sequence is not required. For example, drive traces 620 and 650 could be stimulated in overlapping fashion such that a first trace in drive traces 620 is stimulated, followed by a first trace in drive traces 650, followed by a second trace in drive traces 620 and so on. Alternatively, groups of traces in drive traces 620 could be stimulated first, followed by a group of traces in drive traces 650, and so on.

Figure 7:
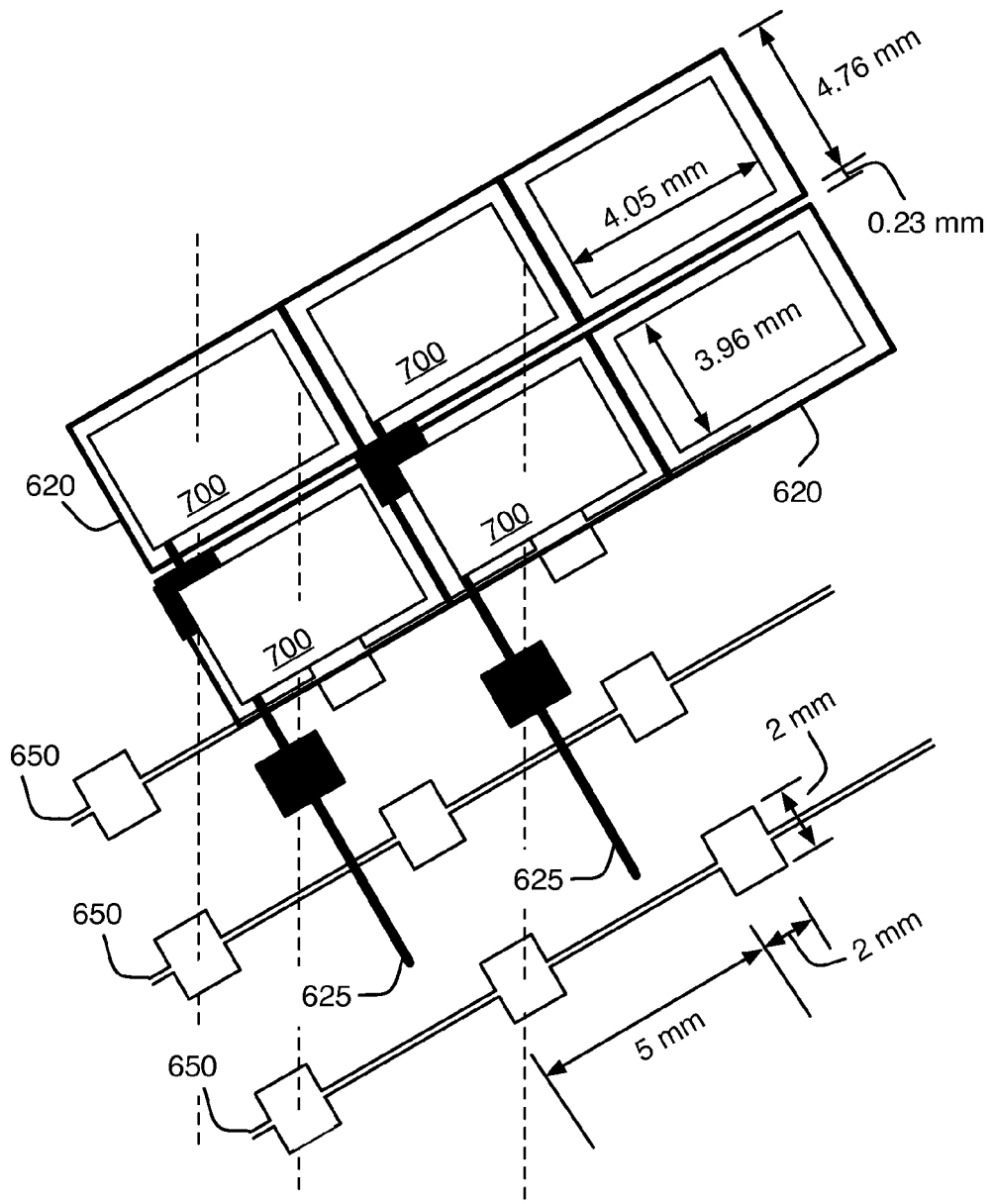
FIG. 7 shows an exploded view of drive and sense traces in accordance with FIG. 6.

In one embodiment drive traces 620 (associated with touch location measurement operations) use a different geometry from drive traces 650 (associated with force measurement operations) and sense traces 625 (used during both location and force measurement operations). Referring to FIG. 7, it can be seen that drive traces 620 utilize conductive traces that employ internal floating plate structures 700 and, in addition, are physically larger than either the conductive traces used in sense 625 and drive traces 650 (both of which, in the illustrated embodiment, have the same physical size/structure). It has been found that this configuration provides increased sensitivity for determining where one or more objects (e.g., a finger of stylus) touch, or come into close proximity to, cosmetic surface 605.

Figure 8A:
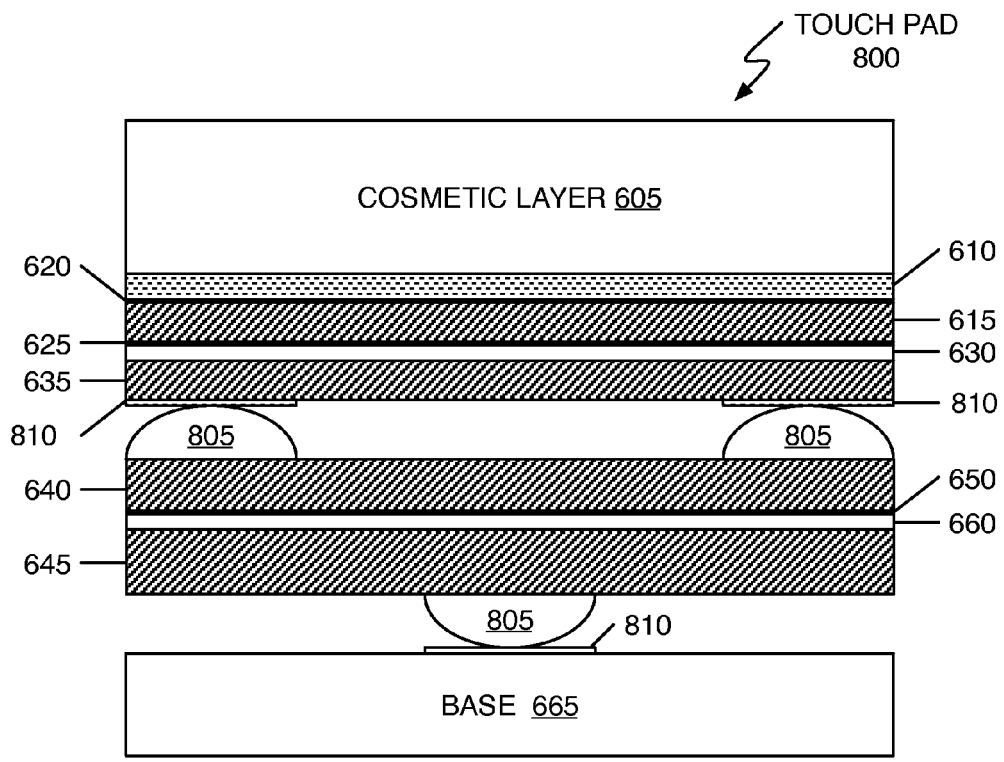
FIGS. 8A-8C show various views of a location and force detection device in accordance with still another embodiment of the invention.
Figure 8B:
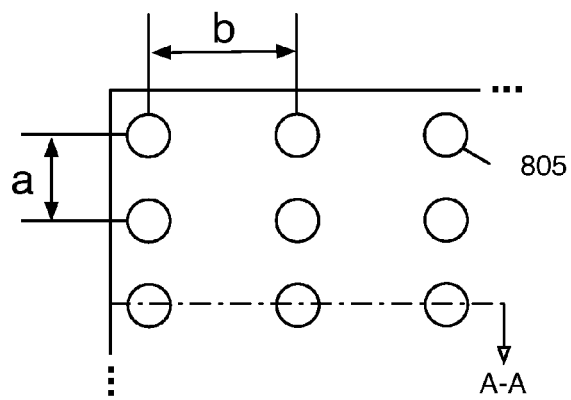

Referring to FIG. 8A, in another embodiment of a combined touch and force sensitive touch pad in accordance with the invention (touch pad 800), raised structures 655 may be replaced by beads or polymer dots 805 (also referred to as rubber or elastomer dots). In this embodiment, beads 805 operate in a manner similar to that of raised structures 655 (see FIG. 6). As shown, beads 805 rest on a thin adhesive layer 810 and are sized to keep layers 630 and 640 at a specified distance when no applied force is present. One illustrative layout and spacing of beads 805 is shown in FIGS. 8B (lop view) and 8C (cross-section). Table 2 identifies the approximate dimensions for each component of touch pad 800 that is different from prior illustrated touch pad 600.

TABLE 2

Dimensions for Illustrative Touch Pad 800

| Layer | Material | Thickness (mm) |
|---|---|---|
| 805 | Rubber or polymer (e.g., elastomer) | |
| 810 | Pressure sensitive adhesive ("PSA") or ultraviolet ("UV") light cured adhesive | 0.015 |
| a | Column bead separation | 1.0 |
| b | Row bead separation | 5.0 |
| c | Bead offset | 2.5 ± 0.15 |
| d | Bead height | 0.15 |

Figure 9A:
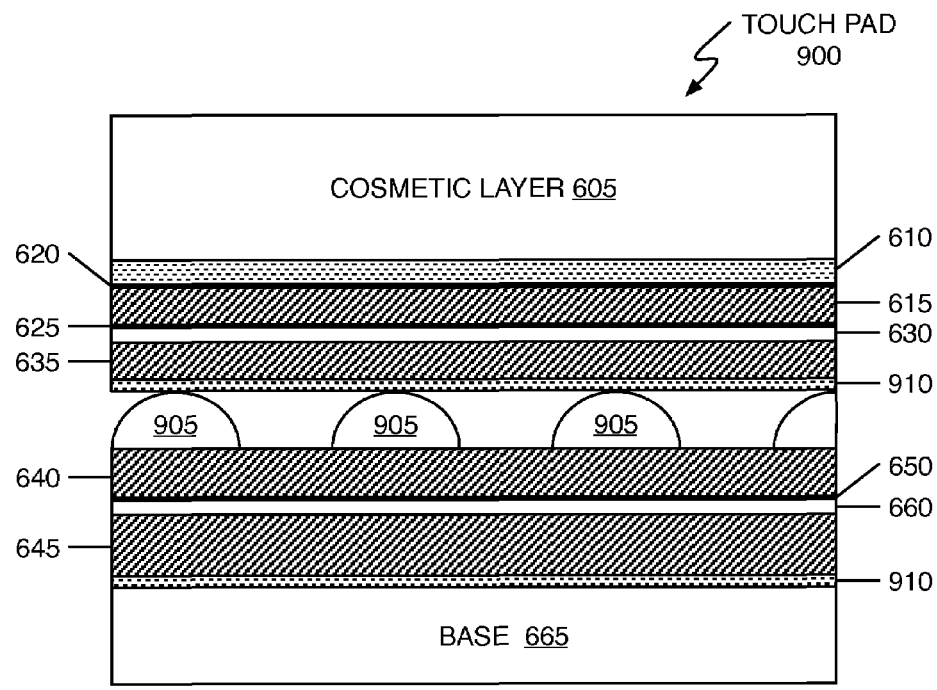
FIGS. 9A-9C show various views of a location and force detection device in accordance with yet another embodiment of the invention.
Figure 9B:
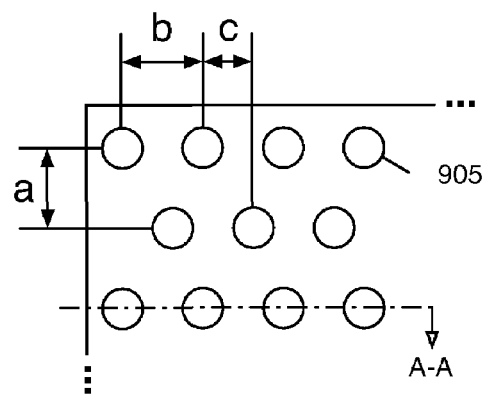

Active touch pad surface: 271 mm × 69 mm
No of drive traces (620 and 650): 13
Number of sense traces (625): 54
Pixel separation: 5 mm Referring to FIG. 9A, in yet another embodiment of a combined touch and force sensitive touch pad in accordance with the invention (touch pad 900), a single layer of deformable beads or elastomer dots 905 are used. In touch pad 900, thin adhesive layers 910 are used to mechanically couple the beads to the rest of the touch pad structure and the structure itself to base 665. One illustrative layout and spacing of deformable beads 905 is shown in FIGS. 9B (lop view) and 9C (cross-section). Table 3 identifies the approximate dimensions for each component of touch pad 900 that is different from prior illustrated touch pad 600.

TABLE 3

Dimensions for Illustrative Touch Pad 900

| Layer | Material | Thickness (mm) |
|---|---|---|
| 905 | Rubber or polymer (e.g., elastomer) | |
| 910 | Pressure sensitive adhesive ("PSA") or ultraviolet ("UV") light cured adhesive | 0.015 |

TABLE 3-continued

Dimensions for Illustrative Touch Pad 900

| Layer | Material | Thickness (mm) |
|---|---|---|
| a | Column bead separation | 1.0 |
| b | Row bead separation | 1.0 |
| c | Bead offset | 0.5 |
| d | Bead width | 0.5 |
| e | Bead height | 0.15 |

Figure 10A:
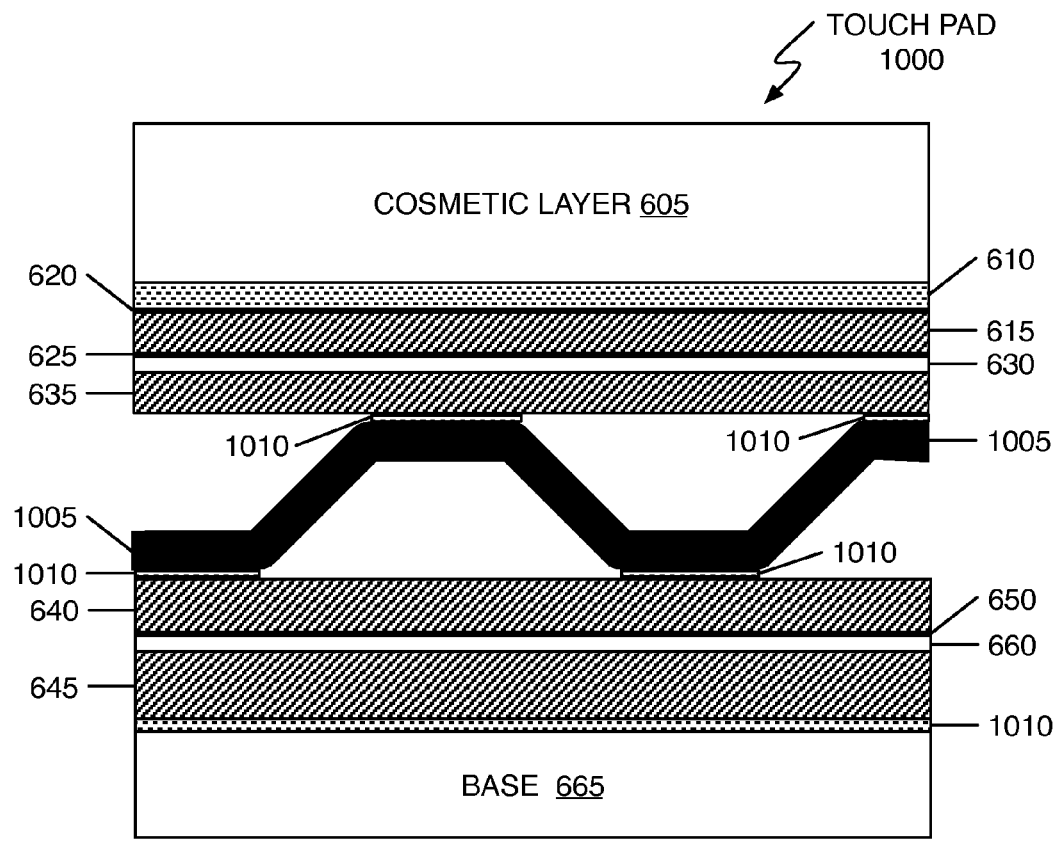
FIGS. 10A and 10B show, in cross section, a location and force detection device in accordance with another embodiment of the invention.
Figure 10B:
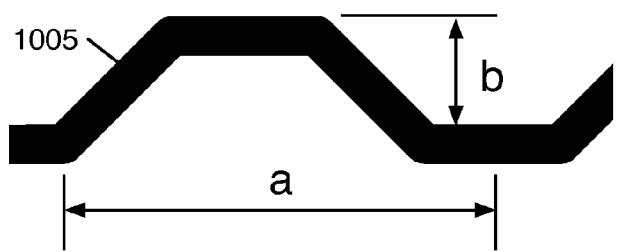

Active touch pad surface: 271 mm × 69 mm
No of drive traces (620 and 650): 13
Number of sense traces (625): 54
Pixel separation: 5 mm Referring to FIG. 10A, in another embodiment of a combined touch and force sensitive touch pad in accordance with the invention (touch pad 1000), spring membrane 1005 is used instead of raised structures (e.g., 530 and 655) or deformable beads (e.g., 805 and 905). In touch pad 1000, thin adhesive layers 1010 are used to mechanically couple PET spring 1005 to layers 635 and 640 as well as to mechanically couple layer 645 to base 665. Referring to FIG. 10B, in one embodiment spring membrane comprises a single rippled sheet of PET whose run-to-rise ratio (i.e., a/b) is typically in the range of approximately 10:1 to 50:1. One of ordinary skill in the art will recognize that the exact value used in any given embodiment may change due to a variety of factors such as, for example, the physical size of the touch pad surface, the amount of weight specified for full deflection (e.g., 200 grams) and the desired sense of "stiffness" presented to the user. Table 4 identifies the approximate dimensions for each component of touch pad 1000 that is different from prior illustrated touch pad 600.

TABLE 4

Dimensions for Illustrative Touch Pad 1000

| Layer | Material | Thickness (mm) |
|---|---|---|
| 1005 | PET | 0.75 |
| 1010 | Pressure sensitive adhesive ("PSA") or ultraviolet ("UV") light cured adhesive | 0.025 |
| a/b | Spring run-to-rise ratio | 10:1 → 50:1 |

Active touch pad surface: 271 mm × 69 mm
No of drive traces (620 and 650): 13
Number of sense traces (625): 54
Pixel separation: 5 mm Referring to FIG. 11A, in another embodiment rippled spring membrane 1005 may be replaced by dimpled spring membrane 1105. In this implementation, spring membrane 1105 is a single sheet of deformable material (e.g., PET) that has dimples formed in it by, for example, thermal or vacuum forming techniques. FIGS. 11B and 11C show top views of two possible dimple arrangements. Two illustrative layouts (lop view) for dimpled membrane 1105 are shown in FIGS. 11B and 11C. As used in FIGS. 11A-11C, the "+" symbol represents a raised region and a "−" symbol represents a depressed region. Table 5 identifies the approximate dimensions "a" through "e" specified in FIG. 11A.

TABLE 5

Dimensions for Illustrative Spring Membrane 1100

| Layer | Material | Thickness (mm) |
|---|---|---|
| 1105 | PET | 0.075 |
| a | Dimple top length | 1.0 |
| b | Dimple width | 1.25 |
| c | Dimple separation | 2.5 |
| d | Dimple rise and fall length | 0.075 |

Various changes in the materials, components and circuit elements are possible without departing from the scope of the following claims. For example, drive traces and sense traces in accordance with FIGS. 1-10 have been described as being orthogonal. The manner in which drive traces and cut across or intersect with sense traces, however, generally depends on the coordinate system used. In a Cartesian coordinate system, for example, sense traces are orthogonal to the driving traces thereby forming nodes with distinct x and y coordinates. Alternatively, in a polar coordinate system, sense traces may be concentric circles while drive traces may be radially extending lines (or vice versa).

In addition, in the embodiments of FIGS. 1 and 2, drive layer 135 and drive traces 140 (and, therefore, connector 145) may be incorporated within and on spring membrane 125. That is, drive traces 140 could be laid down or etched on a surface of flexible membrane 125. Similarly, drive traces 535 could be incorporated into and as part of flexible membrane 525 (see FIG. 5).

Figure 8C:
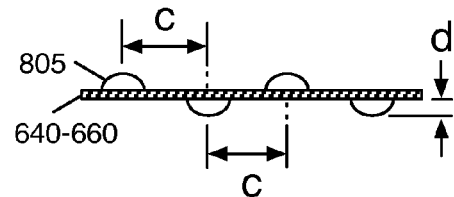
Figure 9C:
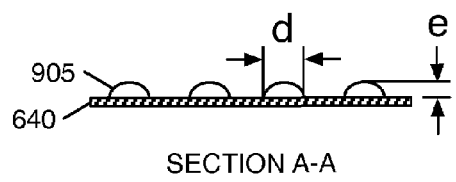

One of ordinary skill in the art will also recognize that beads in accordance with FIGS. 8 and 9 (see FIGS. 8 and 9) could also be used in place of raised structures 130, 530 and 655 (see FIGS. 1, 2A, 2B, 5 and 6). Similarly, spring mechanisms 1005 (see FIG. 10) and 1105 (see FIG. 11) could be used in place of beads 805 (see FIG. 8), deformable beads 805 and 905 (see FIGS. 8 and 9) or raised structures 130, 530 and 655 (see FIGS. 1, 5 and 6).

Figure 12A:
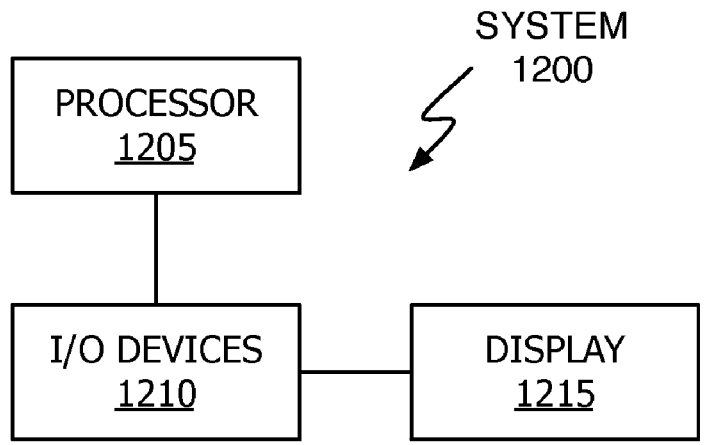
FIGS. 12A and 12B show, in block diagram form, a force detection display system in accordance with one embodiment of the invention.
Figure 12B:
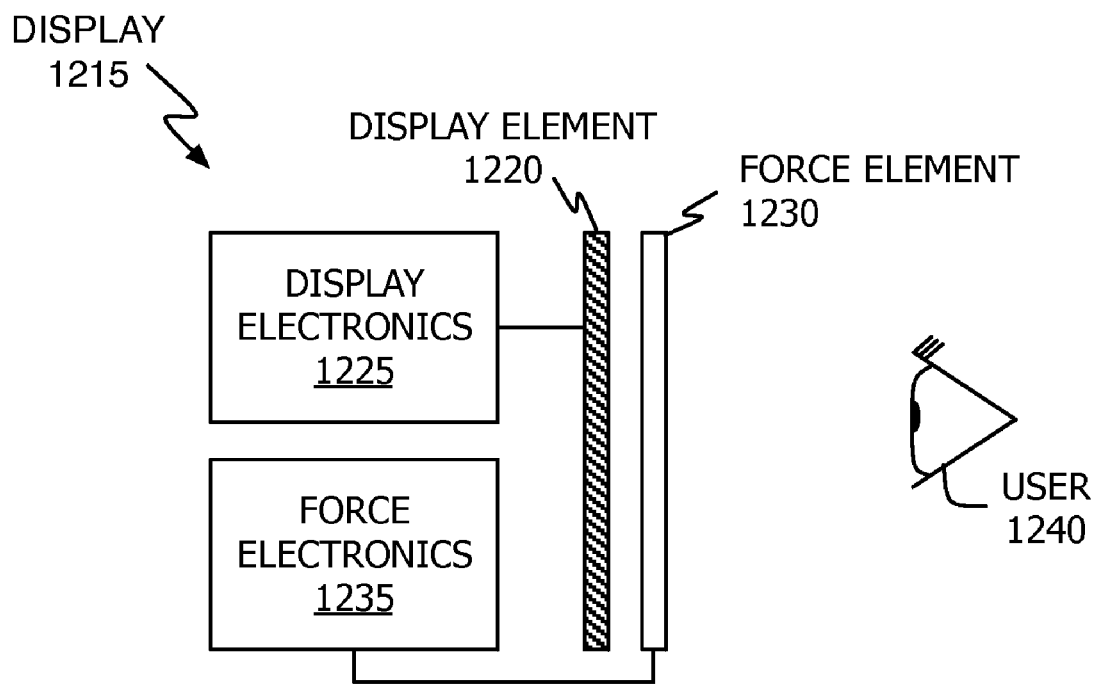

Referring to FIG. 12A, in another embodiment force detection in accordance with the invention may be incorporated within a display unit rather than a touchpad. For example, system 1200 includes processor 1205, standard input-output ("I/O") devices 1210 (e.g., keyboard, mouse, touch pad, joy stick and voice input) and display 1215 incorporating force detection capability in accordance with the invention. Referring to FIG. 12B, in this embodiment, display 1215 includes display element 1220, display element electronics 1225, force element 1230 and force electronics 1235. In this manner, user 1240 views display element 1220 of display 1200 through force element 1230. By way of example, display element 1220 and electronics 125 may comprise a conventional liquid crystal display ("LCD") display. Force element 1230 may comprise a force-only sensor (e.g., similar to the embodiments of FIGS. 1 and 2) or a force and location sensor (e.g., similar to the embodiments of FIGS. 5-11). Force electronics 1235 may comprise processing circuitry as described in FIG. 4. That is, force electronics 1235 is capable of driving and sensing mutual capacitance signals as described in connection with a touch pad in accordance with the invention.

It will be recognized by those of ordinary skill in the art that use of the described force detection technology should, when applied to display 1215, utilize transparent or substantially transparent drive and sense traces such as that provided by ITO (i.e., rather than copper which is opaque). Similarly, the gap between the first layer of traces (e.g., drive traces) and a second layer of traces (e.g., sense traces) used to detect an applied force (see discussion above) should be transparent or substantially transparent. For example, compressible transparent spacers could be used to embody offset raised structures 130, support structures 655, deformable beads 805, 905 or spring membranes 1005, 1105.

The invention claimed is:

1. A force imaging touch pad, comprising:
   a first layer including a first rigid layer and a first plurality of conductive traces oriented in a first direction;
   a second layer including a second rigid layer and a second plurality of conductive traces oriented in a second direction, one of the first or second pluralities of conductive traces configured for receiving electrical stimulation signals, and the first and second pluralities of conductive traces crossing over each other to form a plurality of mutual capacitance sensors between the first and second pluralities of conductive traces at each crossover location; and
   a deformable dielectric membrane juxtaposed between the first and second layers and deformable to move the first plurality of conductive traces closer to the second plurality of conductive traces when a force is applied to the first layer;
   wherein the first and second pluralities of conductive traces are adapted to create a mutual capacitance image when the force is applied to the first layer, the mutual capacitance image indicative of an intensity of the applied force.

2. The force imaging touch pad of claim 1, wherein the first plurality of conductive traces and the second plurality of conductive traces are substantially orthogonal.

3. The force imaging touch pad of claim 1, wherein the deformable dielectric membrane comprises:
   a substantially flat membrane having a first surface oriented toward the first layer and a second surface oriented toward the second layer;
   a first plurality of raised structures coupled to the first surface of the substantially flat membrane; and
   a second plurality of raised structures coupled to the second surface of the substantially flat membrane, wherein the second plurality of raised structures are substantially offset from the first plurality of raised structures.

4. The force imaging touch pad of claim 1, wherein the deformable dielectric membrane comprises:
   a substantially flat membrane; and
   a plurality of deformable beads affixed to one surface of the substantially flat membrane, wherein the deformable beads are adapted to compress when a force is applied to the first layer toward the second layer.

5. The force imaging touch pad of claim 1, wherein the deformable dielectric membrane comprises one or more thermoplastic springs.

6. The force imaging touch pad of claim 1, wherein the deformable dielectric membrane comprises a dimpled deformable membrane.

7. The force imaging touch pad of claim 5, wherein the thermoplastic springs comprise Polyethylene terephthalate.

8. The force imaging touch pad of claim 1, further comprising a mutual capacitance measurement circuit electrically coupled to the first and second pluralities of conductive traces.

9. A force and location imaging touch pad, comprising:
   a first layer including a first plurality of conductive traces oriented in a first direction and a second plurality of conductive traces oriented in a second direction, the first plurality of conductive traces configured for receiving electrical stimulation signals, and the first and second pluralities of conductive traces crossing over each other to form a plurality of mutual capacitance sensors between the first and second pluralities of conductive traces at each crossover location;
   a second layer including a third plurality of conductive traces oriented in substantially the first direction, the third plurality of conductive traces configured for receiving electrical stimulation signals, and the second and third pluralities of conductive traces crossing over each other to form a plurality of mutual capacitance sensors between the second and third pluralities of conductive traces at each crossover location;
   a base layer;
   a first deformable membrane juxtaposed between the first and second layers; and
   a second deformable membrane juxtaposed between the second layer and the base layer,
   wherein the first and second pluralities of conductive traces are adapted to create a first mutual capacitance image when one or more objects come into close proximity to the first layer, the first mutual capacitance image indicative of where the one or more objects are located relative to the first layer,
   wherein the second and third pluralities of conductive traces are adapted to create a second mutual capacitance image when a force is applied to the first layer, the second mutual capacitance image indicative of an intensity of the applied force.

10. The force and location imaging touch pad of claim 9, wherein the first layer comprises a flexible circuit board.

11. The force and location imaging touch pad of claim 9, wherein the first layer comprises one or more layers of thermoplastic resin.

12. The force and location imaging touch pad of claim 9, wherein the first plurality of conductive traces and the second plurality of conductive traces are substantially orthogonal.

13. The force and location imaging touch pad of claim 9, wherein the second layer comprises a flexible circuit board.

14. The force and location imaging touch pad of claim 9, wherein the second layer comprises one or more layers of thermoplastic resin.

15. The force and location imaging touch pad of claim 9, wherein the first deformable membrane comprises a first plurality of raised structures, the second deformable membrane comprises a second plurality of raised structures and the first and second raised structures are substantially spatially offset from one another.

16. The force and location imaging touch pad of claim 15, wherein the first and second pluralities of raised structures comprise thermoplastic resin.

17. The force and location imaging touch pad of claim 9, wherein the first deformable membrane comprises a first plurality deformable beads, the second deformable membrane comprises a second plurality of deformable beads and the first and second pluralities of deformable beads are substantially spatially offset from one another.

18. The force and location imaging touch pad of claim 17, wherein the deformable beads comprise elastomer beads.

19. The force and location imaging touch pad of claim 9, wherein each of the first and second pluralities of raised structures comprises one or more thermoplastic springs.

20. The force and location imaging touch pad of claim 19, wherein the thermoplastic springs comprise Polyethylene terephthalate.

21. The force and location imaging touch pad of claim 9, further comprising a mutual capacitance measurement circuit electrically coupled to the first, second and third pluralities of conductive traces.

22. A force and location imaging touch pad, comprising:
   a first surface having a first plurality of conductive traces oriented in a first direction;
   a second surface having a second plurality of conductive traces oriented in a second direction, the first and second surfaces juxtaposed to and electrically isolated from one another, the first plurality of conductive traces configured for receiving electrical stimulation signals, and the first and second pluralities of conductive traces crossing over each other to form a plurality of mutual capacitance sensors between the first and second pluralities of conductive traces at each crossover location;
   a third surface having a third plurality of conductive traces oriented in substantially the first direction, the third plurality of conductive traces configured for receiving electrical stimulation signals, and the second and third pluralities of conductive traces crossing over each other to form a plurality of mutual capacitance sensors between the second and third pluralities of conductive traces at each crossover location; and
   a deformable membrane between the second and third surfaces,
   wherein the first and second pluralities of conductive traces are adapted to create a first mutual capacitance image when one or more objects come into close proximity to the first surface, the first mutual capacitance image indicative of where the one or more objects are located relative to the first surface,
   wherein the second and third pluralities of conductive traces are adapted to create a second mutual capacitance image when a force is applied to the first surface, the second mutual capacitance image indicative of an intensity of the applied force.

23. The force and location imaging touch pad of claim 22, wherein the first and second surfaces are surfaces of a common layer.

24. The force and location imaging touch pad of claim 23, wherein the common layer comprises a flexible circuit board.

25. The force and location imaging touch pad of claim 23, wherein the common layer comprises one or more layers of thermoplastic resin.

26. The force and location imaging touch pad of claim 22, wherein the first plurality of conductive traces and the second plurality of conductive traces are substantially orthogonal.

27. The force and location imaging touch pad of claim 22, wherein the third surface comprises thermoplastic resin.

28. The force and location imaging touch pad of claim 22, wherein the deformable membrane comprises:
   a substantially flat membrane having a first surface oriented toward the first plurality of conductive traces and a second surface oriented toward the third plurality of conductive traces;
   a first plurality of raised structures coupled to the first surface of the substantially flat membrane; and
   a second plurality of raised structures coupled to the second surface of the substantially flat membrane, wherein the second plurality of raised structures are substantially spatially offset from the first plurality of raised structures.

29. The force and location imaging touch pad of claim 22, wherein the deformable membrane comprises:
   a substantially flat membrane; and
   a plurality of deformable beads affixed to one surface of the substantially flat membrane, wherein the deformable beads are adapted to compress when a force is applied to the first surface toward the second surface.

30. The force and location imaging touch pad of claim 22, wherein the deformable membrane comprises a dimpled deformable membrane.

31. The force and location imaging touch pad of claim 29, wherein the deformable beads comprise a polymer.

32. The force and location imaging touch pad of claim 22, wherein the deformable membrane comprises one or more thermoplastic springs.

33. The force and location imaging touch pad of claim 32, wherein the thermoplastic springs comprise Polyethylene terephthalate.

34. The force and location imaging touch pad of claim 22, further comprising a mutual capacitance measurement circuit electrically coupled to the first, second and third pluralities of conductive traces.

35. An electronic device, comprising:
   a processing unit;
   a display unit operatively coupled to the processing unit;
   a mutual capacitance measurement circuit operatively coupled to the processing unit; and
   a force and location imaging touch pad in accordance with one of claims 9 and 22 and operatively coupled to the mutual capacitance measurement circuit.

36. The electronic device of claim 35, wherein the electronic device comprises a computer system.

37. The electronic device of claim 35, wherein the electronic device comprises a mobile telephone.

38. The electronic device of claim 35, wherein the electronic device comprises a personal digital assistant.

39. A force imaging touch pad, comprising:
   a first layer including a first rigid layer and a first plurality of conductive traces oriented in a first direction;
   a second layer including a deformable dielectric membrane and a second plurality of conductive traces oriented in a second direction, wherein the deformable dielectric membrane is deformable to move the first plurality of conductive traces closer to the second plurality of conductive traces when a force is applied to the first layer, one of the first and second pluralities of conductive traces is configured for receiving electrical stimulation signals, and the first and second pluralities of conductive traces cross over each other to form a plurality of mutual capacitance sensors between the first and second pluralities of conductive traces at each crossover location; and
   a third layer including a second rigid layer, wherein the second layer is disposed between the first and third layers,
   wherein the first and second pluralities of conductive traces are adapted to create a mutual capacitance image when a force is applied to the first layer, the mutual capacitance image indicative of an intensity of the applied force.

40. The force imaging touch pad of claim 39, wherein the first plurality of conductive traces and the second plurality of conductive traces are substantially orthogonal.

41. The force imaging touch pad of claim 39, wherein the deformable dielectric membrane comprises:
   a substantially flat membrane having the first and second surfaces;
   a first plurality of raised structures coupled to the first surface of the substantially flat membrane; and a second plurality of raised structures coupled to the second surface of the substantially flat membrane, wherein the second plurality of raised structures are substantially offset from the first plurality of raised structures.

42. The force imaging touch pad of claim 39, wherein the deformable dielectric membrane comprises:
a substantially flat membrane having the first and second surfaces; and
a plurality of deformable beads affixed to one surface of the substantially flat membrane, wherein the deformable beads are adapted to compress when a force is applied to the first layer toward the second layer.

43. The force imaging touch pad of claim 39, further comprising a mutual capacitance measurement circuit electrically coupled to the first and second pluralities of conductive traces.

44. The force imaging touch pad of claim 39, wherein the first layer further comprises a third plurality of conductive traces oriented in a third direction, wherein the deformable dielectric membrane is juxtaposed closer to the first plurality of conductive traces than to the third plurality of conductive traces, and further wherein the first and third pluralities of conductive traces are adapted to create a capacitance image when an object is brought into close proximity to the first layer, the capacitance image indicative of a location, relative to of the first layer, where the object is located relative to the first layer.

45. The force imaging touch pad of claim 44, wherein the second and third orientations are substantially the same and the first orientation is substantially orthogonal thereto.

46. A force and location imaging touch pad, comprising:
a first layer including a first plurality of conductive traces oriented in a first direction and a second plurality of conductive traces oriented in a second direction, the first plurality of conductive traces configured for receiving electrical stimulation signals, and the first and second pluralities of conductive traces crossing over each other to form a plurality of mutual capacitance sensors between the first and second pluralities of conductive traces at each crossover location;
a second layer including a deformable dielectric membrane and a third plurality of conductive traces oriented in substantially the first direction, the deformable dielectric membrane having a first surface and a second surface, the first surface juxtaposed to the first layer, the third plurality of conductive traces configured for receiving electrical stimulation signals, and the second and third pluralities of conductive traces crossing over each other to form a plurality of mutual capacitance sensors between the second and third pluralities of conductive traces at each crossover location; and
a base layer juxtaposed to the second surface of the deformable dielectric membrane,
wherein the first and second pluralities of conductive traces are adapted to create a first mutual capacitance image when one or more objects come into close proximity to the first layer, the first mutual capacitance image indicative of where the one or more objects are located relative to the first layer,
wherein the second and third pluralities of conductive traces are adapted to create a second mutual capacitance image when a force is applied to the first layer, the second mutual capacitance image indicative of an intensity of the applied force.

47. The force and location imaging touch pad of claim 46, wherein the first layer comprises a flexible circuit board.

48. The force and location imaging touch pad of claim 46, wherein the first layer comprises one or more layers of thermoplastic resin.

49. The force and location imaging touch pad of claim 46, wherein the first plurality of conductive traces and the second plurality of conductive traces are substantially orthogonal.

50. The force and location imaging touch pad of claim 46, wherein the base layer comprises a flexible circuit board.

51. The force and location imaging touch pad of claim 46, wherein the second layer comprises one or more layers of thermoplastic resin.

52. The force and location imaging touch pad of claim 46, wherein the deformable membrane comprises a first plurality of raised structures juxtaposed to the first surface of the deformable membrane and a second plurality of raised structures juxtaposed to the second surface of the deformable membrane, wherein the first and second pluralities of raised structures are substantially spatially offset from one another.

53. The force and location imaging touch pad of claim 52, wherein the first and second pluralities of raised structures comprise thermoplastic resin.

54. The force and location imaging touch pad of claim 46, wherein the deformable membrane further comprises a first plurality deformable beads.

55. The force and location imaging touch pad of claim 54, wherein the deformable beads comprise elastomer beads.

56. The force and location imaging touch pad of claim 46, further comprising a mutual capacitance measurement circuit electrically coupled to the first, second and third pluralities of conductive traces.

57. A force imaging display, comprising:
a display element;
a first layer including a first rigid layer and a first plurality of substantially transparent conductive traces oriented in a first direction, the first layer adjacent to a first surface of the display element;
a second layer including a second rigid layer and a second plurality of substantially transparent conductive traces oriented in a second direction, the first layer juxtaposed between the second layer and the display element, one of the first and second pluralities of conductive traces configured for receiving electrical stimulation signals, and the first and second pluralities of conductive traces crossing over each other to form a plurality of mutual capacitance sensors between the first and second pluralities of conductive traces at each crossover location; and
a deformable substantially transparent dielectric membrane juxtaposed between the first and second layers and deformable to move the first plurality of conductive traces closer to the second plurality of conductive traces when a force is applied to the second layer,
wherein the first and second pluralities of conductive traces are adapted to create a mutual capacitance image when the force is applied to the second layer, the mutual capacitance image indicative of an intensity of the applied force.

58. The force imaging display of claim 57, wherein the display element comprises a liquid crystal display element.

59. The force imaging display of claim 57, wherein the first and second layers comprise Indium tin oxide traces.

60. The force imaging display of claim 57, wherein the first plurality of substantially transparent conductive traces and the second plurality of substantially transparent conductive traces are substantially orthogonal.

61. The force imaging display of claim 57, wherein the substantially transparent deformable dielectric membrane comprises:

a substantially flat membrane having a first surface oriented toward the first layer and a second surface oriented toward the second layer;

a first plurality of raised structures coupled to the first surface of the substantially flat membrane; and a second plurality of raised structures coupled to the second surface of the substantially flat membrane, wherein the second plurality of raised structures are substantially offset from the first plurality of raised structures.

62. The force imaging display of claim 57, wherein the substantially transparent deformable dielectric membrane comprises:

a substantially flat membrane; and a plurality of deformable beads affixed to one surface of the substantially flat membrane, wherein the deformable beads are adapted to compress when a force is applied to the second layer toward the first layer.

* * * * *